(12) United States Patent
Lin

(10) Patent No.: US 6,813,397 B2
(45) Date of Patent: Nov. 2, 2004

(54) MICRO-OPTIC POLARIZATION BEAM MULTIPLEXING/DE-MULTIPLEXING SYSTEM

(76) Inventor: Dong Lin, 2502 Abaca Way, Fremont, CA (US) 94539

( * ) Notice: Subject to any disclaimer, the term of this patent is extended or adjusted under 35 U.S.C. 154(b) by 241 days.

(21) Appl. No.: 09/992,050

(22) Filed: Nov. 21, 2001

(65) Prior Publication Data

US 2003/0095733 A1 May 22, 2003

(51) Int. Cl.[7] ............ G02B 6/28; G02B 6/34; G02B 27/28; G02B 5/30
(52) U.S. Cl. ............ 385/11; 385/24; 385/36; 359/495; 359/496; 359/497
(58) Field of Search ............... 359/124, 127, 359/129, 494–497; 385/11, 29, 31, 36, 39, 47

(56) References Cited

U.S. PATENT DOCUMENTS

| | | | |
|---|---|---|---|
| 4,805,977 A | 2/1989 | Tamura et al. | 350/96.16 |
| 4,881,790 A | 11/1989 | Mollenauer | 350/96.16 |
| 5,740,288 A | 4/1998 | Pan | 385/11 |
| 6,052,394 A | 4/2000 | Lee et al. | 372/6 |
| 6,526,846 B1 * | 3/2003 | Duppong et al. | 74/564 |
| 6,560,015 B1 * | 5/2003 | Cao | 359/487 |
| 2002/0076144 A1 * | 6/2002 | Tai et al. | 385/24 |

* cited by examiner

Primary Examiner—Hemang Sanghavi
Assistant Examiner—Omar Rojas
(74) Attorney, Agent, or Firm—Lumen Intellectual Property Services, Inc.

(57) ABSTRACT

A micro-optic polarization beam multiplexing system has collimating means for introducing a first pair of polarization-perpendicular input beams, collimating means for introducing a second pair of polarization-perpendicular input beams, a polarization beam combiner for combining the first pair and the second pair of input beams into a first combined light beam with wavelength $\lambda_1$ and a second combined light beam with wavelength $\lambda_2$, and a filter for multiplexing the first combined light beam and the second combined light beam into an output beam with wavelengths $\lambda_1$ and $\lambda_2$. The micro-optic system can also be used inversely for de-multiplexing an input beam with wavelength $\lambda_1$ and wavelength $\lambda_2$ into a first de-multiplexed light beam with wavelength $\lambda_1$ and a de-multiplexed light beam with wavelength $\lambda_2$, and then splitting them into two pairs of polarization-perpendicular beams.

51 Claims, 11 Drawing Sheets

$A_1$: forward direction
$A_2$: backward direction $A_1$: forward direction
$A_2$: backward direction

MICRO-OPTIC POLARIZATION BEAM MULTIPLEXING/DE-MULTIPLEXING SYSTEM

FIELD OF THE INVENTION

The present invention relates generally to an optical multiplexing/de-multiplexing system, and in particular to a micro-optic polarization beam multiplexing/de-multiplexing system which integrates polarization beam combiner/splitter (PBC) and wavelength division multiplexer/de-multiplexer (WDM) into one optical module.

BACKGROUND OF THE INVENTION

Modern optical communication demands highly integrated and multi-functional optical components to achieve high performance in both long haul and metro optical networks. There is an increasing demand for an optical system with functions of both optical wavelength division multiplexing/de-multiplexing (WDM) and optical polarization division multiplexing/de-multiplexing (PDM). There are generally two approaches in the fiber optic passive component industry to meet this demand, the all fiber or fusion fiber approach and the micro-optic approach.

In all fiber or fusion fiber approach, a polarization beam combiner/splitter (PBC) can be fabricated by two polarization-maintaining (PM) fibers fused together. Thus, an all-fiber multiplexer/de-multiplexer can be fabricated as simple as a fiber coupler. U.S. Pat. No. 4,881,790 discloses an all-fiber system for coupling two pairs of polarized pumping sources with different wavelengths onto a single optical fiber for Raman pumping. In this system, two polarization selective couplers and one wavelength dependent type coupler are used to combine the two pairs of polarized pumping sources into two combined pumping sources with different wavelengths respectively and then multiplex the two combined pumping sources into one single pumping source.

In the micro-optic approach, an optical system with functions of both optical wavelength division multiplexing/de-multiplexing and optical polarization division multiplexing/de-multiplexing can be made as a combination of polarization beam combiners/splitters (PBC) and a wavelength division multiplexer/de-multiplexer (WDM). Optical polarization beam combiners/splitters (PBC) and wavelength division multiplexers/de-multiplexers (WDM) are known in the art. A micro-optic polarization beam combiner/splitter (PBC) can be as simple as a single piece of optical birefringent crystal, or thin film coating on a right angle prism (RAP), a Nicol prism, a Wollaston prism, a Rochon prism or a Sénarmont prism. Most of these prisms are made of biregringent material wedges serving as optical polarizers. These birefringent materials comprise Calcite, $YVO_4$, Rutile, $LiNbO_3$ and their equivalents. A Micro-optic multiplexer/de-multiplexer is generally based on either of two mechanisms: angular dispersion or optic filtering. Two examples exhibiting angular dispersion are the prism and the blazed reflecting diffraction grating. Various wavelength-selective optical filters can also be used as an optical multiplexer/de-multiplexer.

U.S. Pat. No. 4,805,977 discloses an optical multiplexing system for combining and multiplexing two pairs of linear polarization beams into a single pumping source. In this system, a first polarization prism block combines the first pair of linear polarization beams having the same wavelength $\lambda_1$ into a first combined beam and a second polarization prism block combines the second pair of linear polarization beams having the same wavelength $\lambda_2$ into a second combined beam. An interference filter block is used to multiplex the first and second combined beams into a single pumping source. This prior art reference also discloses an optical multiplexing system for handling three pairs of linear polarization beams with different wavelengths by using three polarization prism blocks and two interference filter blocks. U.S. Pat. No. 6,052,394 discloses a high power pumping device which comprises a similar optical multiplexing system for multiplexing pumping radiations from four diodes by using two polarization beam combiners (PBC) and a wavelength division multiplexing combiner.

U.S. Pat. No. 5,740,288 discloses a variable polarization beam splitter, combiner and mixer. Each of the polarization beam combiner/splitter disclosed in this prior art reference can handle one pair of polarized beams. If two or more pairs of polarized beams with different wavelengths need to be combined, two or more polarization beam combiners are still needed.

In both existing approaches, it is a common drawback that an optical system with functions of both optical wavelength division multiplexing/de-multiplexing (WDM) and optical polarization division multiplexing/de-multiplexing (PDM) is made by simply cascading the function blocks of polarization beam combiner/splitter (PBC) and wavelength division multiplexer/de-multiplexer (WDM) in series. When the number of beams or the complexity of the optical system increases, the number of optical components and the size of the optical system increase accordingly while the total performance decreases.

In view of the above, it would be an advance in the art to provide a micro-optic multiplexing/de-multiplexing which is more compact, less components, high performance and cost-effective. It would be an especially welcome advance to provide a micro-optic multiplexing/de-multiplexing system that integrates one polarization beam combiner/splitter (PBC) and one wavelength division multiplexer/de-multiplexer (WDM), e.g. an optical filter, into one optical module that can handle two or more pairs of polarization-perpendicular beams of different wavelengths.

OBJECTS AND ADVANTAGES

It is a primary object of the present invention to provide a micro-optic polarization beam multiplexing system for multiplexing two polarization-perpendicular pairs of beams of different wavelengths into an output beam by using only one polarization beam combiner and a filter.

It is a further primary object of the present invention to provide a micro-optic polarization beam de-multiplexing system for de-multiplexing an input beam with two different wavelengths into two polarization-perpendicular pairs of beams of different wavelengths by using only one filter and one polarization beam splitter.

It is another object of the present invention to provide a micro-optic polarization beam multiplexing system for multiplexing two polarization-perpendicular pairs of beams of different wavelengths into an output beam by using one polarizing prism as the polarization beam combiner and a filter. The polarizing prism can be selected from a group consisting of Wollaston prism, Rochon prism, Sénarmont prism and their equivalents.

It is another object of the present invention to provide a micro-optic polarization beam de-multiplexing system for de-multiplexing an input beam with two different wavelengths into two polarization-perpendicular pairs of beams of different wavelengths by using only one filter and one polarizing prism as the polarization beam splitter. The polarizing prism can be selected from a group consisting of Wollaston prism, Rochon prism, Sénarmont prism and their equivalents.

It is a further object of the present invention to provide a micro-optic polarization beam multiplexing system for multiplexing two polarization-perpendicular pairs of beams of different wavelengths into an output beam by using one polarization beam combiner and a filter. The polarization beam combiner has two optical wedges and a Faraday rotator disposed between the two wedges.

It is another object of the present invention to provide a micro-optic polarization beam de-multiplexing system for de-multiplexing an input beam with two different wavelengths into two polarization-perpendicular pairs of beams of different wavelengths by using one filter and one polarization beam splitter. The polarization beam splitter has two optical wedges and a Faraday rotator disposed between the two wedges.

It is yet another object of the present invention to provide a micro-optic multiplexing system for pumping high gain Raman amplifiers and Erbium-doped fiber amplifiers (EDFA).

The micro-optic polarization beam multiplexing/de-multiplexing system of the present invention is not limited to handle two polarization-perpendicular pairs of beams of different wavelengths. By any cascading or combining techniques familiar to those skilled in the art, the micro-optic system of the present invention can be easily extended to handle three or more pairs of beams with different wavelengths.

As the micro-optic polarization beam multiplexing/de-multiplexing system of the present invention integrates the polarization beam combiner/splitter, wavelength division multiplexer/de-multiplexer (WDM), and even isolator into one optical module, it is of higher performance, less components, lower loss, lower cost and smaller footprint.

These and numerous other objects and advantages of the present invention will become apparent upon reading the detailed description.

SUMMARY

In accordance with the present invention, a micro-optic polarization beam multiplexing system for multiplexing two polarization-perpendicular pairs of beams of different wavelengths into an output beam is provided. The micro-optic system has a first collimating means for introducing a first input ordinary beam with wavelength $\lambda_{1o}$ of a first pair of input beams, a second collimating means for introducing a first input extraordinary beam with wavelength $\lambda_{1e}$ of the first pair of input beams, a third collimating means for introducing a second input ordinary beam with wavelength $\lambda_{2o}$ of a second pair of input beams, a fourth collimating means for introducing a second input extraordinary beam with wavelength $\lambda_{2e}$ of the second pair of input beams, a polarization beam combiner for combining the first pair of input beams and the second pair of input beams into a first combined light beam with wavelength $\lambda_1$ and a second combined light beam with wavelength $\lambda_2$, and a filter for multiplexing the first combined light beam and the second combined light beam into an output beam with wavelength $\lambda_1$ and wavelength $\lambda_2$. The wavelength $\lambda_1$ equals to the wavelength $\lambda_{1o}$ and the wavelength $\lambda_{1e}$, and the wavelength $\lambda_2$ equals to the wavelength $\lambda_{2o}$ and the wavelength $\lambda_{2e}$. The micro-optic system also has a fifth collimating means for receiving the output beam.

The micro-optic system of the present invention further has a first subassembly holding an end of a first fiber, a second subassembly holding an end of a second fiber, a third subassembly holding an end of a third fiber, a fourth subassembly holding an end of a fourth fiber, and a fifth subassembly holding an end of a fifth fiber. Each subassembly is in paraxial relationship with the corresponding collimating means. The first fiber, the second fiber, the third fiber and the fourth fiber are polarization-maintaining optical fibers, and the fifth fiber is a single mode optical fiber. The filter can be disposed before, after or inside the polarization beam combiner.

It is apparent to those skilled in the art that this micro-optic system can be used inversely as a micro-optic de-multiplexing system for de-multiplexing an input beam with wavelength $\lambda_1$ and wavelength $\lambda_2$ into a first pair of output beams comprising a first output ordinary beam with wavelength $\lambda_{1o}$ and a first output extraordinary beam with wavelength $\lambda_{1e}$ and a second pair of output beams comprising a second output ordinary beam with wavelength $\lambda_{2o}$ and a second output extraordinary beams with wavelength $\lambda_{2e}$.

In accordance with the present invention, there is further provided a micro-optic polarization beam multiplexing system for multiplexing two polarization-perpendicular pairs of beams of different wavelengths into an output beam by using a polarizing prism as the polarization beam combiner. The micro-optic system has a first collimating means for introducing a first input ordinary beam with wavelength $\lambda_{1o}$ of a first pair of input beams, a second collimating means for introducing a first input extraordinary beam with wavelength $\lambda_{1e}$ of the first pair of input beams, a third collimating means for introducing a input second ordinary beam with wavelength $\lambda_{2o}$ of a second pair of input beams, and a fourth collimating means for introducing a second input extraordinary beam with wavelength $\lambda_{2e}$ of the second pair of input beams.

The polarizing prism of the micro-optic polarization beam multiplexing system has a first half and a second half. The first half has a first external surface and a second external surface and the second half has a third external surface opposing to the second external surface and a fourth external surface opposing to the first external surface. The centers of the second external surface and the third external surface define an optical axis. The first half combines the first pair of input beams that are incident on the first external surface into a first combined light beam with wavelength $\lambda_1$. The second half and the first half combining the first pair of input beams that are incident on the third external surface into a second combined light beam with wavelength $\lambda_2$. A filter is disposed between the first half and the second half to reflect light beam with wavelength $\lambda_1$ and be transparent to light beam with wavelength $\lambda_2$, thereby the filter multiplexing the first combined light beam and the second combined light beam into an output beam along the optical axis. The wavelength $\lambda_1$ equals to the wavelength $\lambda_{1o}$ and the wavelength $\lambda_{1e}$, and the wavelength $\lambda_2$ equals to the wavelength $\lambda_{2o}$ and the wavelength $\lambda_{2e}$. The micro-optic system also has a fifth collimating means for receiving the output beam.

The micro-optic system further has a first subassembly holding an end of a first fiber, a second subassembly holding an end of a second fiber, a third subassembly holding an end of a third fiber, a fourth subassembly holding an end of a fourth fiber, and a fifth subassembly holding an end of a fifth fiber. Each subassembly is in paraxial relationship with the corresponding collimating means. The first fiber, the second fiber, the third fiber and the fourth fiber are polarization-maintaining optical fibers, and the fifth fiber is a single mode optical fiber. The polarizing prism can be selected from a group consisting of Wollaston prism, Rochon prism, Sénarmont prism and their equivalents. A rotator can also be disposed between the two halves of the polarizing prism before or after the filter.

It is also apparent to those skilled in the art that this micro-optic system with a polarizing prism and a filter can be used inversely as a micro-optic de-multiplexing system for de-multiplexing an input beam with wavelength $\lambda_1$ and wavelength $\lambda_2$ into a first pair of output beams comprising a first output ordinary beam with wavelength $\lambda_{1o}$ and a first output extraordinary beam with wavelength $\lambda_{1e}$ and a second pair of output beams comprising a second output ordinary beam with wavelength $\lambda_{2o}$ and a second output extraordinary beams with wavelength $\lambda_{2e}$.

In accordance with the present invention, there is also provided a micro-optic polarization beam multiplexing system for multiplexing two polarization-perpendicular pairs of beams of different wavelengths into an output beam by using two optical wedges and a Faraday rotator as the polarization beam combiner.

The micro-optic polarization beam multiplexing system has a first collimating means for introducing a first input ordinary beam with wavelength $\lambda_{1o}$ of a first pair of input beams, a second collimating means for introducing a first input extraordinary beam with wavelength $\lambda_{1e}$ of the first pair of input beams, a third collimating means for introducing a second input ordinary beam with wavelength $\lambda_{2o}$ of a second pair of input beams and a fourth collimating means for introducing a second input extraordinary beam with wavelength $\lambda_{2e}$ of the second pair of input beams.

The polarization beam combiner has a first wedge, a second wedge, and a +45° Faraday rotator disposed between the first wedge and the second wedge. The first wedge, the faraday rotator and the second wedge are cascaded along an optical axis in a forward direction, and the second wedge is oriented 45° with respect to the first wedge in the same direction as the rotation caused by the Faraday rotator.

A filter is disposed after the second wedge. The first pair of input beams is incident in the forward direction on the first wedge symmetrically with respect to the optical axis with a predetermined convergent angle between each other. These two beams propagate through the first wedge, the Faraday rotator and the second wedge, and then are incident on the filter. The second pair of input beams is incident in a backward direction (opposite to the forward direction) on the filter symmetrically with respect to the optical axis with a predetermined convergent angle between each other.

The filter reflects the first pair of input beams with wavelength $\lambda_1$ and is transparent to the second pair of input beams with wavelength $\lambda_2$, thereby the polarization beam combiner combining the first pair of input beams into a first combined light beam with wavelength $\lambda_1$ in the backward direction along the optical axis and the second pair of input beams into a second combined light beam with wavelength $\lambda_2$ in the backward direction along the optical axis. Therefore the filter multiplexes the first combined light beam and the second combined light beam into an output beam with wavelength $\lambda_1$ and wavelength $\lambda_2$. Also, the wavelength $\lambda_1$ equals to the wavelength $\lambda_{1o}$ and the wavelength $\lambda_{1e}$, the wavelength $\lambda_2$ equals to the wavelength $\lambda_{2o}$ and the wavelength $\lambda_{2e}$. The micro-optic system further has a fifth collimating means for receiving the output beam. Each of the collimating means can be a separate one for one fiber or can be shared by two or all fibers at one side of the system.

The first collimating means, the second collimating means and the fifth collimating means can share a first collimator, and the third collimating means and the fourth collimating means can share a second collimator. The first collimator is positioned before the first wedge, and the second collimator is positioned after the filter.

The micro-optic system further has a first subassembly holding an end of a first fiber, a second subassembly holding an end of a second fiber, a third subassembly holding an end of a third fiber, and a fourth subassembly holding an end of a fourth fiber. The first fiber and the second fiber are polarization-maintaining fibers being positioned before the first collimator and parallel to the optical axis. The polarization directions of the first fiber and the second fiber are 90 degree apart from each other for introducing the first pair of input beams. The third fiber and the fourth fiber are polarization-maintaining fibers being positioned after the second collimator and parallel to the optical axis. The polarization directions of the third fiber and the fourth fiber are 90 degrees apart from each other for introducing the second pair of input beams. The micro-optic system further has a fifth subassembly holding an end of a fifth fiber that is positioned before the first collimator and along the optical axis. The fifth fiber is a single mode optical fiber for receiving the output beam.

It is also apparent to those skilled in the art that this micro-optic system with such a design having a Faraday rotator, two optical wedges and a filter can be used inversely as a micro-optic de-multiplexing system for de-multiplexing an input beam from the fifth fiber with wavelength $\lambda_1$ and wavelength $\lambda_2$ into a first pair of output beams comprising a first output ordinary beam with wavelength $\lambda_{1o}$ and a first output extraordinary beam with wavelength $\lambda_{1e}$ and a second pair of output beams comprising a second output ordinary beam with wavelength $\lambda_{2o}$ and a second output extraordinary beams with wavelength $\lambda_{2e}$. Under this situation, the second wedge is oriented 45° with respect to the first wedge in the opposite direction as the rotation caused by the Faraday rotator.

The micro-optic polarization beam multiplexing system can further have a first polarizer disposed in front of the first fiber and a second polarizer disposed in front of the second fiber. The backward light beams of the first combined light beam from the fifth fiber are reflected by the filter and blocked by the first polarizer and the second polarizer respectively from entering into the first fiber and the second fiber. The backward light beams of the second combined light beam from the fifth fiber pass through the polarization beam combiner and the filter and become parallel to the optical axis, thereby being prevented from entering into the third fiber and the fourth fiber.

The micro-optic polarization beam multiplexing system of the present invention further has a sixth subassembly holding an end of a sixth fiber. The sixth fiber is a single mode optical fiber disposed after the second collimator along the optical axis. The light beam with telecommunication signals propagate in the forward direction from the fifth fiber, passes through the first collimator, the polarization beam combiner, the filter and the second collimator and then enters into the sixth fiber.

The micro-optic polarization beam multiplexing system can be used to provide an output beam that is a sum or a combination of the first pair of input beams and the pair of input beams for pumping a Raman amplifier. The micro-optic system can also be used to provide an output beam that is a sum or a combination of the first pair of input beams and the second pair of input beams for pumping an EDFA.

The filter of the present invention can be a grating, a thin film, or any other tunable and non-tunable filters familiar to those skilled in the art. Each collimating means of the present invention can have a GRIN lens, or a spherical leans, an aspherical lens or any other single or array-type collimators familiar to those skilled in the art.

The micro-optic multiplexing/de-multiplexing system of the present invention is not limited to handle only two polarization-perpendicular pairs of beams of different wavelengths. By any cascading or combining techniques familiar to those skilled in the art, the Micro-optic system of the present invention can be easily extended to handle three or more pairs of beams with different wavelengths.

The above summary of the present invention is not intended to describe each disclosed embodiment or every implementation of the present invention. The figures and the detailed description will more particularly exemplify these embodiments.

Figure 1:
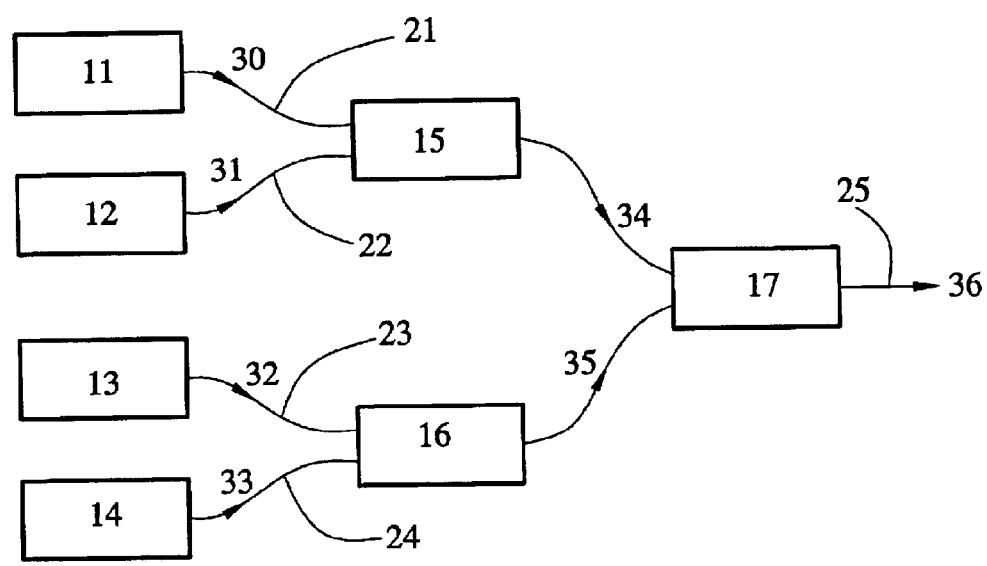
FIG. 1 is a schematic illustration of an all-fiber polarization beam multiplexing system in the prior art.

While the invention is amenable to various modifications and alternative forms, specifies thereof have been shown by way of examples in the drawings and will be described in detail. It should be understood, however, that the intention is not to limit the present invention to the particular embodiments described. On the contrary, the intention is to cover all modifications, equivalents, and alternatives falling within the spirit and scope of the present invention.

DETAILED DESCRIPTION

FIG. 1 is a schematic illustration of an all-fiber polarization beam multiplexing system 10 in the prior art for Raman pumping. In FIGS. 1, 11, 12, 13 and 14 refer to four individual pump sources that emit polarized radiations. Source 11 and 12 emit a first pair of polarization-perpendicular beams 30, 31 with same wavelength $\lambda_1$. Source 13 and 14 emit a second pair of polarization-perpendicular beams 32, 33 with same wavelength $\lambda_2$. A first polarization selective coupler 15 combines the first pair of polarization-perpendicular beams 30, 31 into a first combined beam 34 with wavelength $\lambda_1$. A second polarization selective coupler 16 combines the second pair of polarization-perpendicular beams 32, 33 into a second combined beam 35 with wavelength $\lambda_2$. A wavelength dependent type coupler 17 multiplexes the first combined beam 34 and the second combined beam 35 into an output beam 36 with wavelength $\lambda_1$ and wavelength $\lambda_2$. The fiber 21, 22, 23 and 24 are polarization-maintaining fibers and fiber 25 is a single mode optical fiber.

Figure 2:
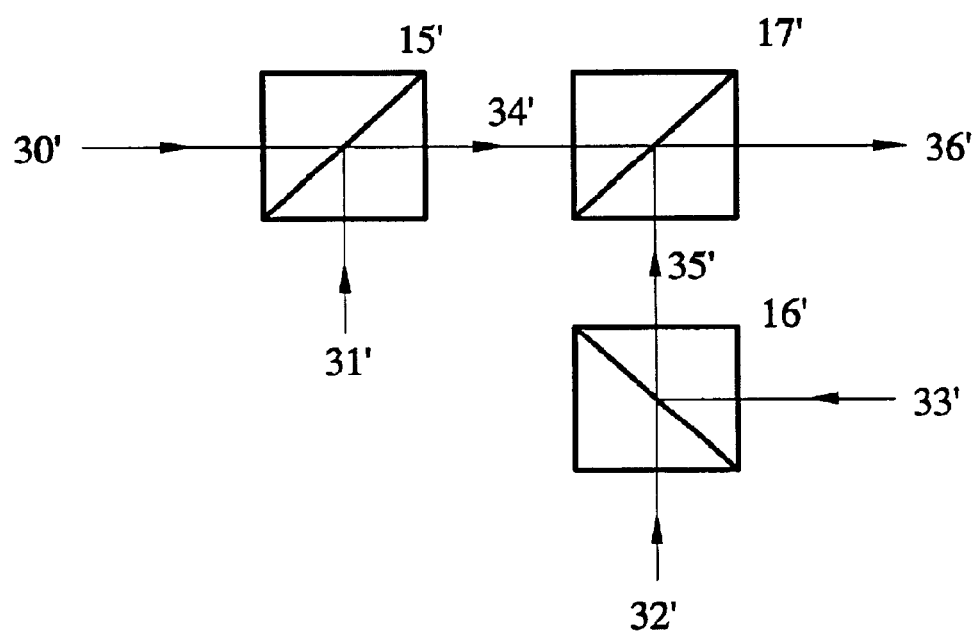
FIG. 2 is a schematic illustration of a micro-optic polarization beam multiplexing system in the prior art.

FIG. 2 is a schematic illustration of a micro-optic polarization beam multiplexing system 10' in the prior art for optical direct amplifier using the stimulated Raman effect. In FIG. 2, a first pair of semiconductor lasers (not shown) and corresponding collimators (not shown) produce a first pair of polarization-perpendicular beams 30', 31' with wavelength $\lambda_1$. A second pair of semiconductor lasers (not shown) and corresponding collimators (not shown) produce a second pair of polarization-perpendicular beams 32', 33' with wavelength $\lambda_2$. A first polarization prism block 15' combines the first pair of polarization-perpendicular beams 30', 31' into a first combined beam 34' with wavelength $\lambda_1$. A second polarization prism block 16' combines the second pair of polarization-perpendicular beams 32', 33' into a second combined beam 35' with wavelength $\lambda_2$. An interference filter block 17' multiplexes the first combined beam 34' and the second combined beam 35' into an output beam 36' with wavelength $\lambda_1$ and wavelength $\lambda_2$.

In both FIG. 1 and FIG. 2, there is a common drawback of making a polarization beam multiplexing system with functions of both optical wavelength division multiplexing/de-multiplexing and optical polarization division multiplexing/de-multiplexing by simply cascading the function blocks of polarization beam combiner/splitter and wavelength division multiplexer/de-multiplexer in series. When the number of pairs of beams or the complexity of the optical system increases, the number of optical components and the size of the optical system increase accordingly while the total performance decreases.

Figure 3:
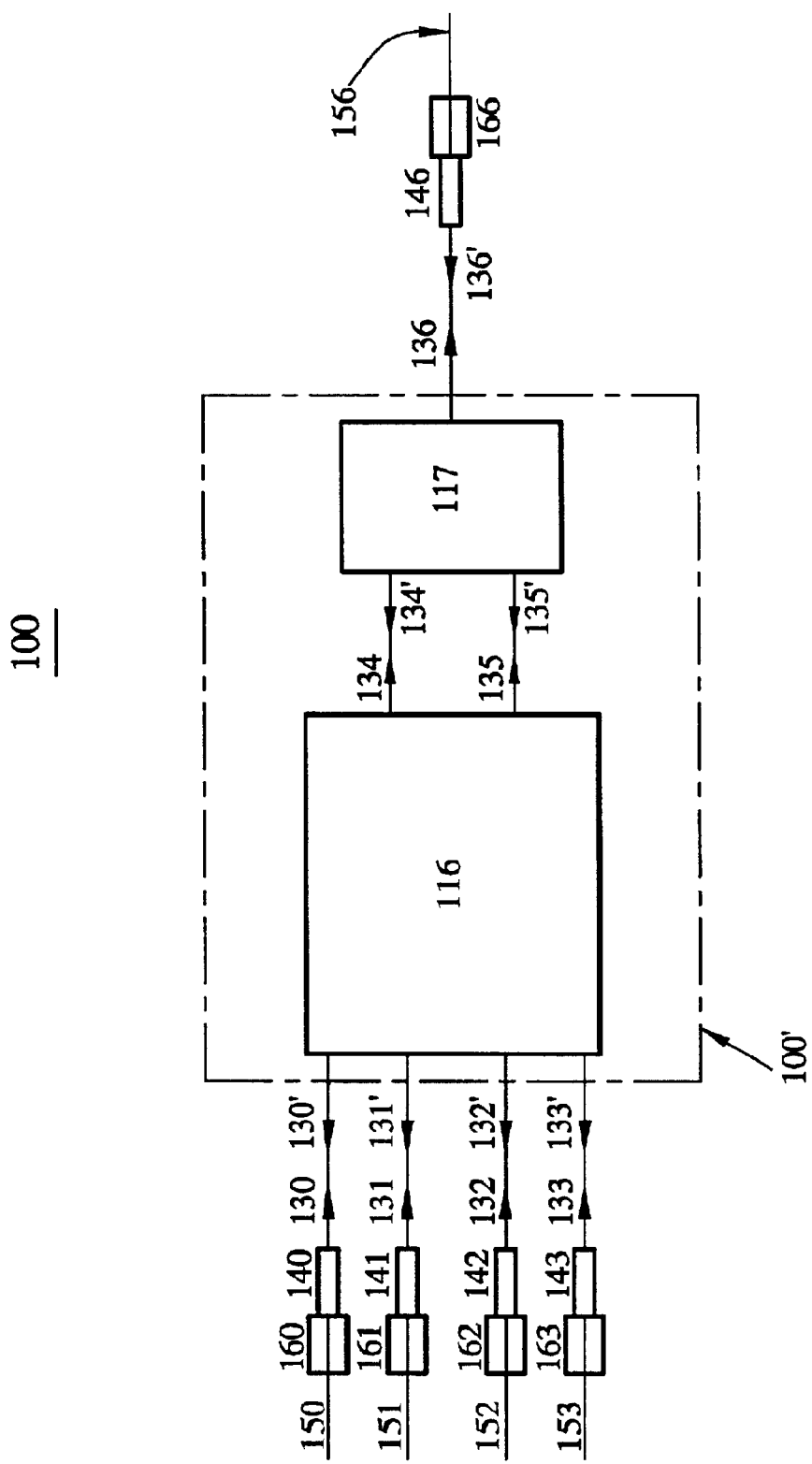
FIG. 3 is a schematic view of the micro-optic polarization beam multiplexing/de-multiplexing system of the present invention.

FIG. 3 is a schematic view of the micro-optic polarization beam multiplexing/de-multiplexing system 100 of the present invention. The micro-optic system 100 has a first collimating means 140 for introducing a first input ordinary beam 130 with wavelength $\lambda_{1o}$ of a first pair of input beams, a second collimating means 141 for introducing a first input extraordinary beam 131 with wavelength $\lambda_{1e}$ of the first pair of input beams, a third collimating means 142 for introducing a second input ordinary beam 132 with wavelength $\lambda_{2o}$ of a second pair of input beams and a fourth collimating means 143 for introducing a second input extraordinary beam 133 with wavelength $\lambda_{2e}$ of the second pair of input beams. A polarization beam combiner/splitter 116 combines the first pair of input beams and the second pair of input beams into a first combined light beam 134 with wavelength $\lambda_1$ and a second combined light beam 135 with wavelength $\lambda_2$. A filter 117 multiplexes the first combined light beam 134 and the second combined light beam 135 into an output beam 136 with wavelength $\lambda_1$ and wavelength $\lambda_2$. The wavelength $\lambda_1$ equals to wavelength $\lambda_{1o}$ and wavelength $\lambda_{1e}$, and the wavelength $\lambda_2$ equals to wavelength $\lambda_{2o}$ and wavelength $\lambda_{2e}$. The micro-optic system further has a fifth collimating means 146 for receiving the output beam 136.

In FIG. 3, the filter 117 is disposed after the polarization beam combiner/splitter 116 for simplifying the explanation.

The relationship between the filter 117 and the polarization beam combiner/splitter 116 of the present invention is not limited to this situation. The filter 117 can also be disposed before, or inside the polarization beam combiner/splitter 116. The combining function and the multiplexing function of the micro-optic system 100 can not be absolutely considered to be independently performed by the polarization beam combiner/splitter 116 and the filter 117 respectively. These functions should be considered to be performed by the cooperation of the polarization beam combiner/splitter 116 and the filter 117 working together as an integrated module 100'.

Each of the first input ordinary beam 130, the first input extraordinary beam 131, the second input ordinary beam 132 and the second input extraordinary beam 133 is defined with respect to the optic axis and material property of the first optical component of the polarization beam combiner/splitter 116 it meets. Each of the first collimating means 140, the second collimating means 141, the third collimating means 142, the fourth collimating means 143 and the fifth collimating means 146 is not necessarily a separate one. Two or more of the collimating means 140, 141, 142, 143 and 146 can share one collimating device. For example, the first collimating means 140 and the second collimating means 141 can share one collimating device. The third collimating means 142 and the fourth collimating means 143 can also share another collimating device.

As shown in FIG. 3, the micro-optic system 100 of the present invention further has a first subassembly 160 holding an end of a first fiber 150 in paraxial relationship with the first collimating means 140, a second subassembly 161 holding an end of a second fiber 151 in paraxial relationship with the second collimating means 141, a third subassembly 162 holding an end of a third fiber 152 in paraxial relationship with the third collimating means 142, a fourth subassembly 163 holding an end of a fourth fiber 153 in paraxial relationship with the fourth collimating means 143 and a fifth subassembly 166 holding an end of a fifth fiber 156 in paraxial relationship with the fifth collimating means 146. In multiplexing applications, the first fiber 150, the second fiber 151, the third fiber 152 and the fourth fiber 153 are polarization-maintaining optical fibers, and the fifth fiber 156 is a single mode optical fiber. In the present application, the term "paraxial relationship" should be considered to cover "coaxial relationship" and "substantially coaxial relationship" and their equivalents.

Each of the first collimating means 140, the second collimating means 141, the third collimating means 142, the fourth collimating means 143 and the fifth collimating means 146 has a GRIN lens, or a spherical lens, or an aspherical lens, or any other collimating devices familiar to those skilled in the art.

The polarization beam combiner/splitter 116 can have a birefringent crystal. The optical birefringent crystal can be a material selected from group consisting of Calcite, $YVO_4$, Rutile and $LiNbO_3$.

The polarization beam combiner/splitter 116 can also have a prism selected from the group consisting of Glan polarizing prism, right angle prism coated with thin film, Nicol prism, Wollaston prism, Rochon prism and Sénarmont prism.

The polarization beam combiner/splitter 116 of the present invention can also comprise a first wedge, a second wedge, and a Faraday rotator disposed between the first wedge and the second wedge. The first wedge, the Faraday rotator and the second wedge are cascaded along an optical axis. The filter 117 of the present invention can be a grating, a thin film, or any other tunable and non-tunable optical filters familiar to those skilled in the art.

Still referring to FIG. 3, it is apparent to those skilled in the art that the micro-optic system of FIG. 3 can also be used inversely as a micro-optic polarization beam de-multiplexing system. As shown in FIG. 3, the filter 117 de-multiplexes an input beam 136' with wavelength $\lambda_1$ and wavelength $\lambda_2$ into a first de-multiplexed light beam 134' with wavelength $\lambda_1$ and a second de-multiplexed light beam 135' with wavelength $\lambda_2$. The polarization beam combiner/splitter 116 splits the first de-multiplexing light beam 134' and the second de-multiplexing light beam 135' into a first pair of output beams comprising a first output ordinary beam 130' with wavelength $\lambda_{1o}$ and a first output extraordinary beam 131' with wavelength $\lambda_{1e}$ and a second pair of output beams comprising a second output ordinary beam 132' with wavelength $\lambda_{2o}$ and a second output extraordinary beams 133' with wavelength $\lambda_{2e}$. The wavelength $\lambda_1$ equals to wavelength $\lambda_{1o}$ and wavelength $\lambda_{1e}$, and the wavelength $\lambda_2$ equals to wavelength $\lambda_{2o}$ and wavelength $\lambda_{2e}$.

Each of the first output ordinary beam 130' the first output extraordinary beam 131', the second output ordinary beam 132' and the second output extraordinary beam 133' is defined with respect to the optic axis and material property of the last optical component of the polarization beam combiner/splitter 116 it leaves.

The splitting function of the polarization beam combiner/splitter 116 and the de-multiplexing function of the filter 117 should not be absolutely considered to be independently performed by the polarization beam combiner/splitter 116 and the filter 117 respectively. These functions should be considered to be performed by the cooperation of the polarization beam combiner/splitter 116 and the filter 117 working together as an integrated module 100'. However, in de-multiplexing applications, the first fiber 150, the second fiber 151, the third fiber 152 and the fourth fiber 153 can be polarization-maintaining optical fibers or single mode optical fibers, and the fifth fiber 156 is a single mode optical fiber.

Figure 4:
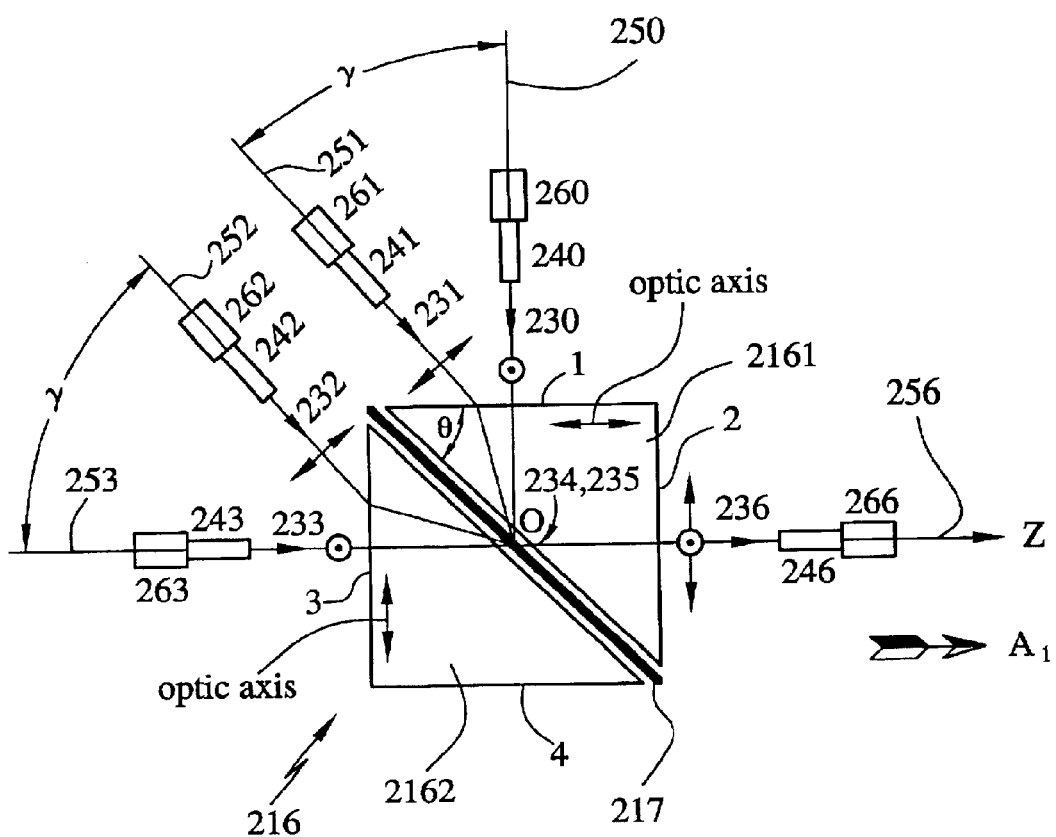
FIG. 4 shows an embodiment of the micro-optic polarization beam multiplexing system of the present invention.

FIG. 4 shows an embodiment of the micro-optic polarization beam multiplexing system 200 of the present invention. In FIG. 4, the micro-optic system 200 has a first collimating means 240 for introducing a first input ordinary beam 230 with wavelength $\lambda_{1o}$ of a first pair of input beams, a second collimating means 241 for introducing a first input extraordinary beam 231 with wavelength $\lambda_{1e}$ of the first pair of input beams, a third collimating means 242 for introducing a second input extraordinary beam 232 with wavelength $\lambda_{2e}$ of a second pair of input beams and a fourth collimating means 243 for introducing a second input ordinary beam 233 with wavelength $\lambda_{2o}$ of the second pair of input beams. The beams 230, 231, 232 and 233 are substantially collimated beams.

A polarizing prism 216 having a first half 2161 and a second half 2162 is used as the polarization beam combiner. The first half 2161 has a first external surface 1 and a second external surface 2, and the second half 2162 has a third external surface 3 opposing to the second external surface 2 and a fourth external surface 4 opposing to the first external surface 1. The centers of the second external surface 2 and the third external surface 3 define an optical axis Z. The first half 2161 combines the first pair of input beams 230, 231 which are incident on the first external surface 1 into a first combined light beam 234 with wavelength $\lambda_1$. The second half 2162 and the first half 2161 combines the second pair of input beams 232, 233 which are incident on the third external surface 3 into a second combined light beam 235 with wavelength $\lambda_2$.

A filter 217 is disposed between the first half 2161 and the second half 2162. The filter 217 reflects light beam with wavelength $\lambda_1$ and is transparent to light beam with wavelength $\lambda_2$, thereby the filter 217 multiplexing the first combined light beam 234 and the second combined light beam 235 into an output beam 236 along the forward direction $A_1$ of the optical axis Z. The wavelength $\lambda_1$ equals to the wavelength $\lambda_{1o}$ and the wavelength $\lambda_{1e}$, and the wavelength $\lambda_2$ equals to the wavelength $\lambda_{2o}$ and the wavelength $\lambda_{2e}$. The micro-optic system 200 further has a fifth collimating means 246 for receiving the output beam 236. The point O is the crossing point of the optical axis Z and the filter 217.

Each of the first input ordinary beam 230, the first input extraordinary beam 231, the second input ordinary beam 233 and the second input extraordinary beam 232 is defined with respect to the optic axis and material property of the first half 2161 or second half 2162 of the polarizing prism 216. In FIG. 4, a Sénarmont prism is used as an example of a polarizing prism 216 which is made from a uniaxial negative material, e.g. Calcite. The polarizing prism 216 can also be made from any other uniaxial negative materials and uniaxial positive materials familiar to those skilled in the art. The polarizing prism 216 can be selected from a group consisting of Wollaston prism, Rochon prism, Sénarmont prism and their equivalents.

It is apparent to those skilled in the art that the convergent angle $\gamma$ between the beam 232 and beam 233, or the convergent angle $\gamma$ between the beam 230 and beam 231 can be easily obtained. As shown in FIG. 4, if the polarizing prism 216 is a Sénarmont prism with a wedge angle $\theta=45$ degree, the angle $\gamma$ can be calculated by $$\gamma = \arc \sin\left[(n_o - n_e) * \tan \theta\right] = \arc \sin\left[(n_o - n_e)\right] \quad (1)$$

where $n_o$ is the ordinary refractive index of the Sénarmont prism and $n_e$ is the extra-ordinary refractive index of the Sénarmont prism.

Each of the first collimating means 240, the second collimating means 241, the third collimating means 242, the fourth collimating means 243 and the fifth collimating means 246 is not necessarily a separate one. Two or more of the collimating means 240, 241, 242, 243 and 246 can share one collimating device. For example, the first collimating means 240 and the second collimating means 241 can share one collimating device. The third collimating means 242 and the fourth collimating means 243 can share another collimating device.

As shown in FIG. 4, the micro-optic system 200 of the present invention further has a first subassembly 260 holding an end of a first fiber 250 in paraxial relationship with the first collimating means 240, a second subassembly holding 261 an end of a second fiber 251 in paraxial relationship with the second collimating means 241, a third subassembly 262 holding an end of a third fiber 252 in paraxial relationship with the third collimating means 242, a fourth subassembly 263 holding an end of a fourth fiber 253 in paraxial relationship with the fourth collimating means 243 and a fifth subassembly 266 holding an end of a fifth fiber 256 in paraxial relationship with the fifth collimating means 246. In multiplexing applications, the first fiber 250, the second fiber 251, the third fiber 252 and the fourth fiber 253 are polarization-maintaining optical fibers, and the fifth fiber 256 is a single mode optical fiber.

Each of the first collimating means 240, the second collimating means 241, the third collimating means 242, the fourth collimating means 243 and the fifth collimating means 246 can have a GRIN lens, or a spherical lens, or an aspherical lens or any other collimating devices familiar to those skilled in the art. The filter 217 of the embodiment can be a grating, a thin film, or any other tunable and non-tunable optical filters familiar to those skilled in the art.

It is apparent to those skilled in the art that the micro-optic polarization beam multiplexing system of FIG. 4 can also be used inversely as a micro-optic polarization beam de-multiplexing system.

Figure 5:
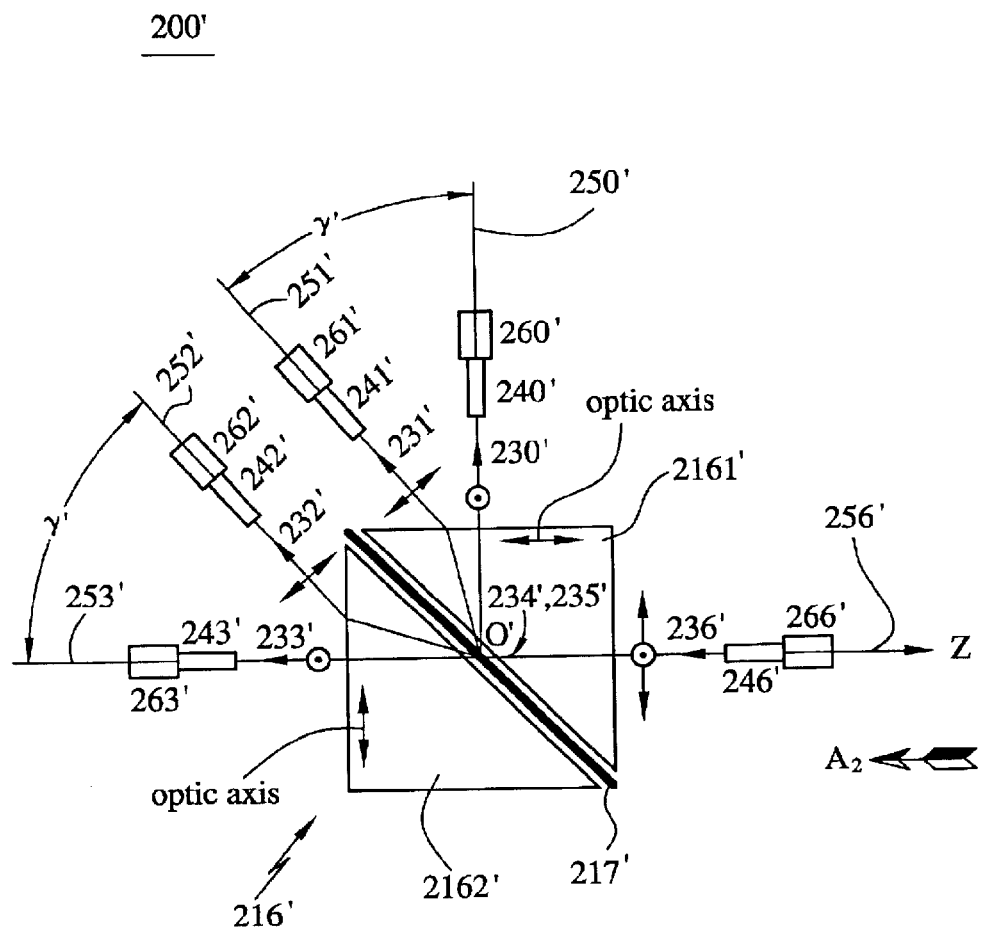
FIG. 5 shows another embodiment of the present invention as a micro-optic polarization beam de-multiplexing system.

FIG. 5 shows another embodiment of the present invention as a micro-optic polarization beam de-multiplexing system 200'. In FIG. 5, the micro-optic system 200' has a fifth collimating means 246' for introducing the input beam 236' with wavelength $\lambda_1$ and wavelength $\lambda_2$. A filter 217' disposed between the first half 2161' and second half 2162' of the polarizing prism 216'. The filter 217' reflects light beam with wavelength $\lambda_1$ and is transparent to light beam with wavelength $\lambda_2$, thereby de-multiplexing the input beam 236' with wavelength $\lambda_1$ and wavelength $\lambda_2$ along the backward direction $A_2$ of the optical axis Z into a first de-multiplexed light beam 234' with wavelength $\lambda_1$ and a second de-multiplexed light beam 235' with wavelength $\lambda_2$. Point O' is the crossing point of the optical axis Z and the filter 217'. The first half 2161' of the polarizing prism 216' splits the first de-multiplexed light beam 234' into a first pair of output beams comprising a first output ordinary beam 230' with wavelength $\lambda_{1o}$ and a first output extraordinary beam 231' with wavelength $\lambda_{1e}$. The second half 2162' of the polarizing prism 216' splits the second de-multiplexed light beam 235' into a second pair of output beams comprising a second output ordinary beam 233' with wavelength $\lambda_{2o}$ and a second output extraordinary beams 232' with wavelength $\lambda_{2e}$.

The wavelength $\lambda_1$ equals to the wavelength $\lambda_{1o}$ and the wavelength $\lambda_{1e}$, and the wavelength $\lambda_2$ equals to the wavelength $\lambda_{2o}$ and the wavelength $\lambda_{2e}$. Each of the first output ordinary beam 230', the first output extraordinary beam 231', the second output ordinary beam 233' and the second output extraordinary beam 232' is defined with respect to the optic axis and material property of the first half 2161' or second half 2162' of the polarizing prism 216'. Similarly, it is apparent to those skilled in the art that the diverging angle $\gamma'$ between the beam 232' and beam 233', or the converging angle $\gamma'$ between the beam 230' and beam 231' can also be easily obtained. The polarizing prism 216' can be selected from a group consisting of Wollaston prism, Rochon prism, Sénarmont prism and their equivalents.

The micro-optic system 200' further has a first collimating means 240' for receiving the first output ordinary beam 230', a second collimating means 241' for receiving the first output extraordinary beam 231', a third collimating means 242' for receiving the second output extraordinary beam 232', a fourth collimating means 243' for receiving the second ordinary beam 233'.

The micro-optic system 200' can also have a first subassembly 260' holding an end of a first fiber 250' in paraxial relationship with the first collimating means 240', a second subassembly 261' holding an end of a second fiber 251' in paraxial relationship with the second collimating means 241', a third subassembly 262' holding an end of a third fiber 252' in paraxial relationship with the third collimating means 242', a fourth subassembly 263' holding an end of a fourth fiber 253' in paraxial relationship with the fourth collimating means 243', and a fifth subassembly 266' holding an end of a fifth fiber 256' in paraxial relationship with the fifth collimating means 246'. In de-multiplexing applications, the first fiber 250', the second fiber 251', the third fiber 252' and the fourth fiber 253' can be polarization-maintaining optical fibers or single mode optical fibers, and the fifth fiber 256' is a single mode optical fiber.

Each of the first collimating means 240', the second collimating means 241', the third collimating means 242', the fourth collimating means 243' and the fifth collimating means 246' can have a GRIN lens, or a spherical lens, or an aspherical lens, or any other collimating devices familiar to those skilled in the art. The filter 217' of the embodiment can be a grating, a thin film, or any other tunable and non-tunable optical filters familiar to those skilled in the art.

Figure 6:
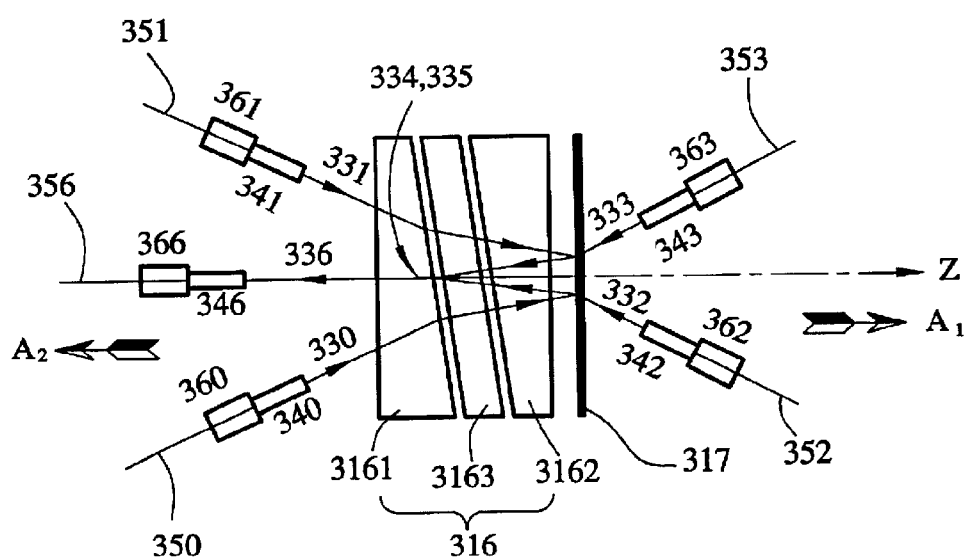
FIG. 6 shows another embodiment of the present invention with a polarization beam combiner having two optical wedges and a Faraday rotator disposed between the two wedges.

FIG. 6 shows another embodiment of the present invention with a polarization beam combiner having two optical wedges and a Faraday rotator disposed between the two wedges. In FIG. 6, the micro-optic polarization beam multiplexing system 300 has a first collimating means 340 for introducing a first input ordinary beam 330 with wavelength $\lambda_{1o}$ of a first pair of input beams, a second collimating means 341 for introducing a first input extraordinary beam 331 with wavelength $\lambda_{1e}$ of the first pair of input beams, a third collimating means 342 for introducing a second input ordinary beam 332 with wavelength $\lambda_{2o}$ of a second pair of input beams, a fourth collimating means 343 for introducing a second input extraordinary beam 333 with wavelength $\lambda_{2e}$ of the second pair of input beams.

The polarization beam combiner 316 has a first wedge 3161, a second wedge 3162 and a +45° Faraday rotator 3163 disposed between the first wedge 3161 and the second wedge 3162. The first wedge 3161, the Faraday rotator 3163 and the second wedge 3162 are cascaded along an optical axis Z in a forward direction $A_1$. The second wedge 3162 is oriented 45° with respect to the first wedge 3161 in the same direction as the rotation caused by the Faraday rotator 3163.

The polarization directions of the first input ordinary beam 330 and the first input extraordinary beam 331 are 90 degrees apart from each other, such that the first input ordinary beam 330 is an ordinary ray to the first wedge 3161 and the first input extraordinary beam 331 is an extraordinary ray to the first wedge 3161. The polarization directions of the second input ordinary beam 332 and the second input extraordinary beam 333 are 90 degrees apart from each other, such that the second input ordinary beam 332 is an ordinary ray to the second wedge 3162 and the second input extraordinary beam 333 is an extraordinary ray to the second wedge 3162.

A filter 317 is disposed after the second wedge 3162. The first pair of input beams 330, 331 are incident in the forward direction $A_1$ on the first wedge 3161 symmetrically with respect to optical axis Z with a predetermined convergent angle β (see also FIG. 7) between each other, propagate through the first wedge 3161, the Faraday rotator 3163 and the second wedge 3162, and then incident on the filter 317. The second pair of input beams 332, 333 are incident in a backward direction $A_2$ opposite to the forward direction $A_1$ on the filter 317 symmetrically with respect to the optical axis Z with a predetermined convergent angle β (see also FIG. 8) between each other.

The filter 317 reflects the first pair of input beams 330, 331 with wavelength $\lambda_{1o}$ and wavelength $\lambda_{1e}$ and is transparent to the second pair of input beams 332, 333 with wavelength $\lambda_{2o}$ and wavelength $\lambda_{2e}$. Thus, the polarization beam combiner 316 combines the first pair of input beams 330, 331 into a first combined light beam 334 with wavelength $\lambda_1$ in the backward direction $A_2$ along the optical axis Z and the second pair of input beams 332, 333 into a second combined light beam 335 with wavelength $\lambda_2$ in the backward direction $A_2$ along the optical axis Z. At the same time, the filter 317 multiplexes the first combined light beam 334 and the second combined light beam 335 into an output beam 336. The wavelength $\lambda_1$ equals to the wavelength $\lambda_{1o}$ and the wavelength $\lambda_{1e}$, and the wavelength $\lambda_2$ equals to the wavelength $\lambda_{2o}$ and the wavelength $\lambda_{2e}$. The micro-optic system further has a fifth collimating means 346 for receiving the output beam 336.

As shown in FIG. 6, the micro-optic system 300 of the present invention further has a first subassembly 360 holding an end of a first fiber 350 in paraxial relationship with the first collimating means 340, a second subassembly holding 361 an end of a second fiber 351 in paraxial relationship with the second collimating means 341, a third subassembly 362 holding an end of a third fiber 352 in paraxial relationship with the third collimating means 342, a fourth subassembly 363 holding an end of a fourth fiber 353 in paraxial relationship with the fourth collimating means 343 and a fifth subassembly 366 holding an end of a fifth fiber 356 in paraxial relationship with the fifth collimating means 346. The first fiber 350, the second fiber 351, the third fiber 352 and the fourth fiber 353 are polarization-maintaining optical fibers, and the fifth fiber 356 is a single mode optical fiber.

Each of the first collimating means 340, the second collimating means 341, the third collimating means 342, the fourth collimating means 343 and the fifth collimating means 346 can have a GRIN lens, or a spherical lens, or an aspherical lens, or any other collimating devices familiar to those skilled in the art. The filter 317 of the embodiment can be a grating, a thin film, or any other tunable and non-tunable optical filters familiar to those skilled in the art.

Figure 7:
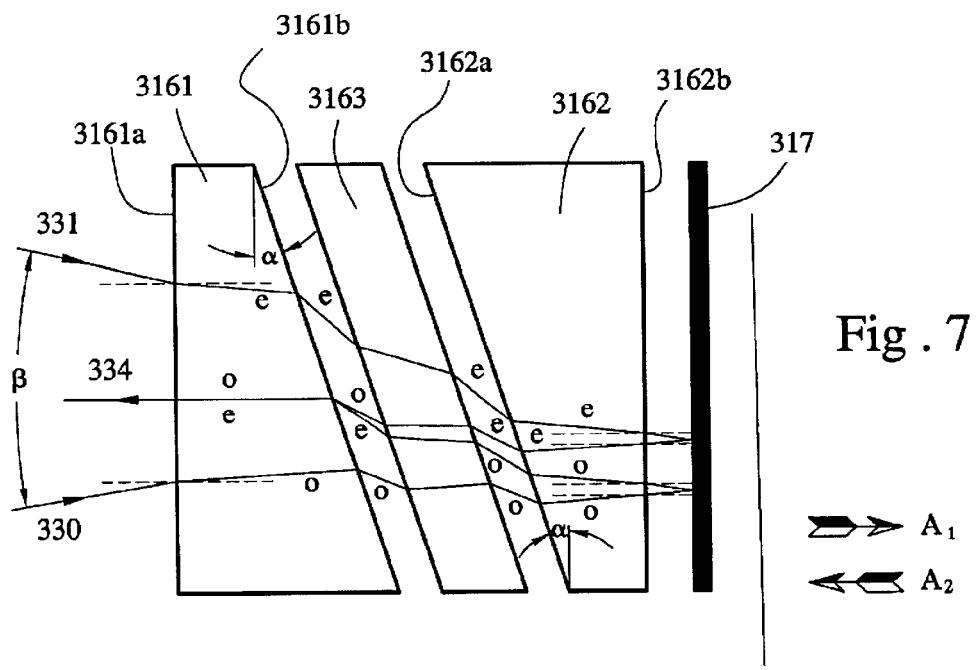
FIG. 7 illustrates the detailed optical paths of the first pair of input beams of an embodiment of the present invention.

FIG. 7 illustrates the detailed optical paths of the first pair of input beams 330, 331 of the embodiment. In FIG. 7, the polarization directions of the first input ordinary beam 330 and the first input extraordinary beam 331 are 90 degrees apart from each other, such that the first input ordinary beam 330 is an ordinary ray to the first wedge 3161 and the first input extraordinary beam 331 is an extraordinary ray to the first wedge 3161. After passing through the first wedge 3161 in a forward direction $A_1$, beam 330 and beam 331 are rotated 45 degree by the Faraday rotator 3163. Since the optic axis of the second wedge 3162 is oriented 45 degree with respect to the optic axis of the first wedge 3161 and in the same direction as the rotation caused by the Faraday rotator 3163. So the beam 331 is still the extraordinary ray to the second wedge 3162 and the beam 330 is still the ordinary ray to the second wedge 3162. Beam 330 and beam 331 travel in the same direction in the second wedge 3162 as they do in the first wedge 3161.

After reflected by the filter 317, the beam 330 and beam 331 travel through the second wedge 3162, the Faraday rotator 3163 and the first wedge 3161 in a backward direction $A_2$ as shown in FIG. 7. Since the optic axis of the first wedge 3161 is oriented 45 degree with respect to the optic axis of the second wedge 3162 and in the opposite direction as the rotation caused by the Faraday rotator 3163, the beam 331 which is an extraordinary ray of the second wedge 3162 becomes an ordinary ray of the first wedge 3161 while the beam 330 which is an ordinary ray of the second wedge 3162 becomes extraordinary ray of the first wedge 3161. So the beam 330 and beam 331 are combined in the backward direction $A_2$ into the first combined beam 334.

In FIG. 7, small letters o and e indicate the extraordinary and ordinary statuses of the beam 330 and beam 331 at different locations. The first pair of input beams 330, 331 and the first combined beam 334 are substantially collimated beams.

Figure 8:
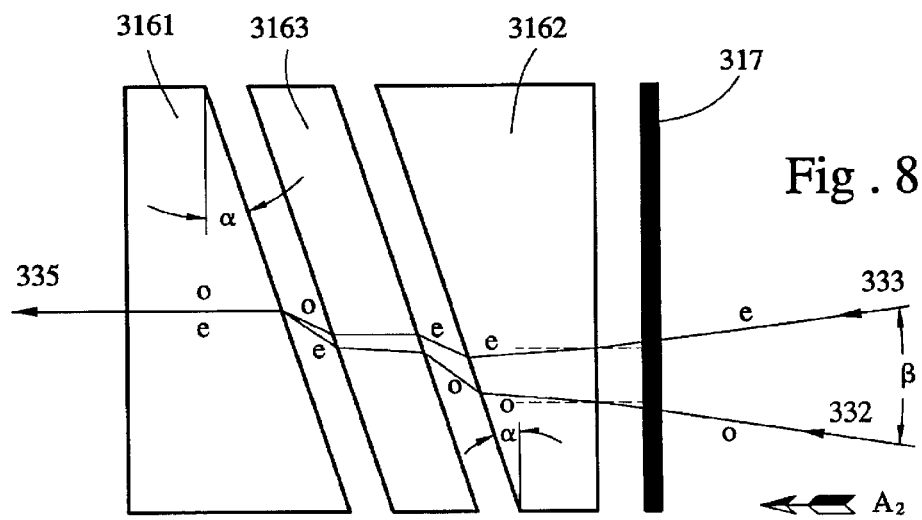
FIG. 8 illustrates the detailed optical paths of the second pair of input beams of an embodiment of the present invention.

FIG. 8 illustrates the detailed optical paths of the second pair of input beams 332, 333 of the embodiment. In FIG. 8, the polarization directions of the second input ordinary beam 332 and the first input extraordinary beam 333 are 90 degrees apart from each other, such that the second input ordinary beam 332 is an ordinary ray to the second wedge 3162 and the second input extraordinary beam 333 is an extraordinary ray to the second wedge 3162.

After passing through the filter 317, the beam 332 and beam 333 travel through the second wedge 3162, the Faraday rotator 3163 and the first wedge 3161 from right to left along a backward direction $A_2$ as shown in FIG. 8. Since the optic axis of the first wedge 3161 is oriented 45 degree with respect to the optic axis of the second wedge 3162 and in the opposite direction as the rotation caused by the Faraday rotator 3163, the beam 333 which is an extraordinary ray of the second wedge 3162 becomes an ordinary ray of the first wedge 3161 while the beam 332 which is an ordinary ray of the second wedge 3162 becomes extraordinary ray of the first wedge 3161. So the beam 332 and beam 333 are combined in the backward direction $A_2$ into the second combined beam 335.

In FIG. 8, small letters o and e indicate the extraordinary and ordinary statuses of the beam 332 and beam 333 at different locations. The second pair of input beams 332, 333 and the first combined beam 335 are substantially collimated beams.

It is also apparent to those skilled in the art that the convergent angle $\beta$ between the beam 331 and beam 330 in FIG. 7, or the convergent angle $\beta$ between the beam 332 and beam 333 in FIG. 8 can be easily obtained. As shown in FIGS. 7 and 8, the angle $\beta$ can be calculated by $$\beta = 2*\arcsin[(n_o - n_e)*\tan\alpha] \quad (2)$$

where $\alpha$ is the incline angle of the second surface 3161b of the first wedge 3161 and the incline angle of the first surface 3162a of the second wedge 3162, $n_o$ is the ordinary refractive index of the two wedges and $n_e$ is the extra-ordinary refractive index of the two wedges. The optic axis of the first wedge 3161 is oriented 45 degree with respect to the optic axis of the second wedge 3162. Both he optic axis of the first wedge 3161 and the optic axis of the second wedge 3162 are parallel to the first surface 3161a of the first wedge 3161 and the second surface 3162b of the second wedge 3162.

Figure 9:
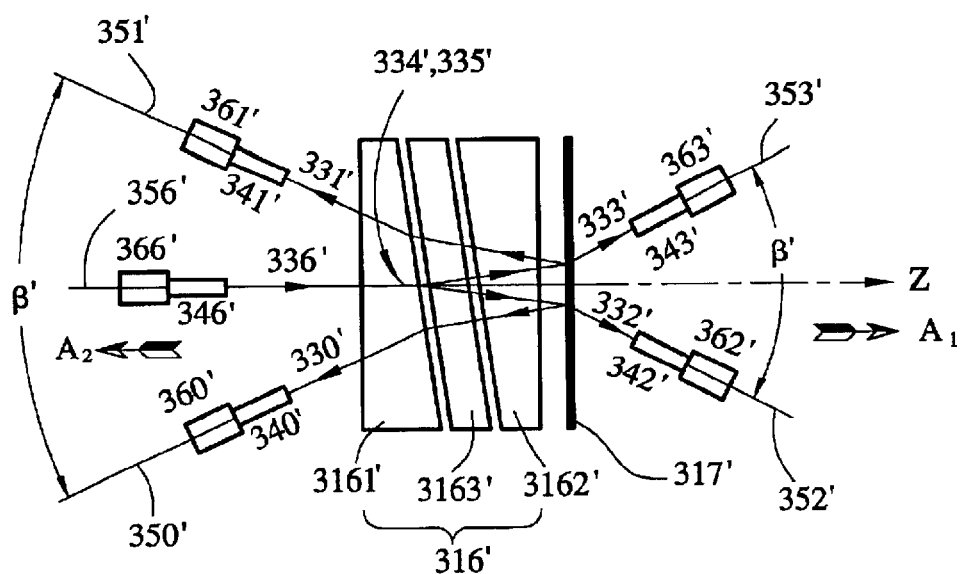
FIG. 9 shows another embodiment of the present invention as a micro-optic polarization beam de-multiplexing system.

Similarly, the micro-optic system of the embodiment of FIG. 6 can also be use inversely as a micro-optic polarization beam de-multiplexing system. FIG. 9 shows such a micro-optic polarization beam de-multiplexing system as another embodiment of the present invention. In FIG. 9, the micro-optic system 300' has a fifth collimating means 346' for introducing an input beam 336' with wavelength $\lambda_1$ and wavelength $\lambda_2$, a polarization beam splitter 316' having a first wedge 3161', a second wedge 3162', and a +45° Faraday rotator 3163' disposed between the first wedge 3161' and the second wedge 3162'. The first wedge 3161', the Faraday rotator 3163' and the second wedge 3161' are cascaded along an optical axis Z in a forward direction $A_1$. The second wedge 3162' is oriented 45° with respect to the first wedge 3161' in the opposite direction as the rotation caused by the Faraday rotator 3163'.

A filter 317' is disposed after the second wedge 3162'. The input beam 336' is incident along the optical axis Z in the forward direction $A_1$, passes through the polarization beam splitter 316' and then incident on the filter 317'. The filter 317' reflects the portion of light beams with wavelength $\lambda_1$ of the input beam 336' and is transparent to the portion of light beams with wavelength $\lambda_2$ of the input beam 336', thereby the filter 317' de-multiplexing the input beam 336' into a first de-multiplexed light beam 334' with wavelength $\lambda_1$ and a second de-multiplexed light beam 335' with wavelength $\lambda_2$. The polarization beam splitter 316' splits the first de-multiplexed light beam 334' into a first pair of output beams comprising a first output ordinary beam 330' with wavelength $\lambda_{1o}$ and a first output extraordinary beam 331' with wavelength $\lambda_{1e}$ in a backward direction $A_2$ symmetrically with respect to the optical axis Z with a predetermined diverging angle $\beta'$ between each other, and the second de-multiplexed light beam 335' into a second pair of output beams comprising a second output ordinary beam 332' with wavelength $\lambda_{2o}$ and a second output extraordinary beams 333' with wavelength $\lambda_{2e}$ in the forward direction $A_1$ symmetrically with respect to the optical axis Z with a predetermined diverging angle $\beta'$ between each other. The wavelength $\lambda_1$ equals to wavelength $\lambda_{1o}$ and wavelength $\lambda_{1e}$, and the wavelength $\lambda_2$ equals to wavelength $\lambda_{2o}$ and wavelength $\lambda_{2e}$. In FIG. 9, it is clear to those skilled in the art that the splitting function of the polarization beam splitter 316' starts before the input beam 336' reaches the filter 317'.

Similarly, it is also apparent to those skilled in the art that the convergent angle $\beta'$ between the beam 331' and beam 330' and the convergent angle $\beta'$ between the beam 332' and beam 33 in FIG. 9 can be easily obtained (see also equation (2) and FIGS. 7 and 8).

The micro-optic system further has a first collimating means 341' for receiving the first output ordinary beam 330', a second collimating means 341' for receiving the first output extraordinary beam 331', a third collimating means 342' for receiving the second output ordinary beam 332' and a fourth collimating means 343' for receiving the second output extraordinary beam 333'.

As shown in FIG. 9, the micro-optic system 300' of the present invention further has a first subassembly 360' holding an end of a first fiber 350' in paraxial relationship with the first collimating means 340', a second subassembly holding 361' an end of a second fiber 351' in paraxial relationship with the second collimating means 341', a third subassembly 362' holding an end of a third fiber 352' in paraxial relationship with the third collimating means 342', a fourth subassembly 363' holding an end of a fourth fiber 353' in paraxial relationship with the fourth collimating means 343' and a fifth subassembly 366' holding an end of a fifth fiber 356' in paraxial relationship with the fifth collimating means 346'. In de-multiplexing applications, the first fiber 350', the second fiber 351', the third fiber 352' and the fourth fiber 353' can be polarization-maintaining optical fibers or single mode optical fibers, and the fifth fiber 356' is a single mode optical fiber.

Each of the first collimating means 340', the second collimating means 341', the third collimating means 342', the fourth collimating means 343' and the fifth collimating means 346' can have a GRIN lens, or a spherical lens, or an aspherical lens or any other collimating devices familiar to those skilled in the art. The filter 317' of the embodiment can be a grating, a thin film, or any other tunable and non-tunable optical filters familiar to those skilled in the art.

Figure 10:
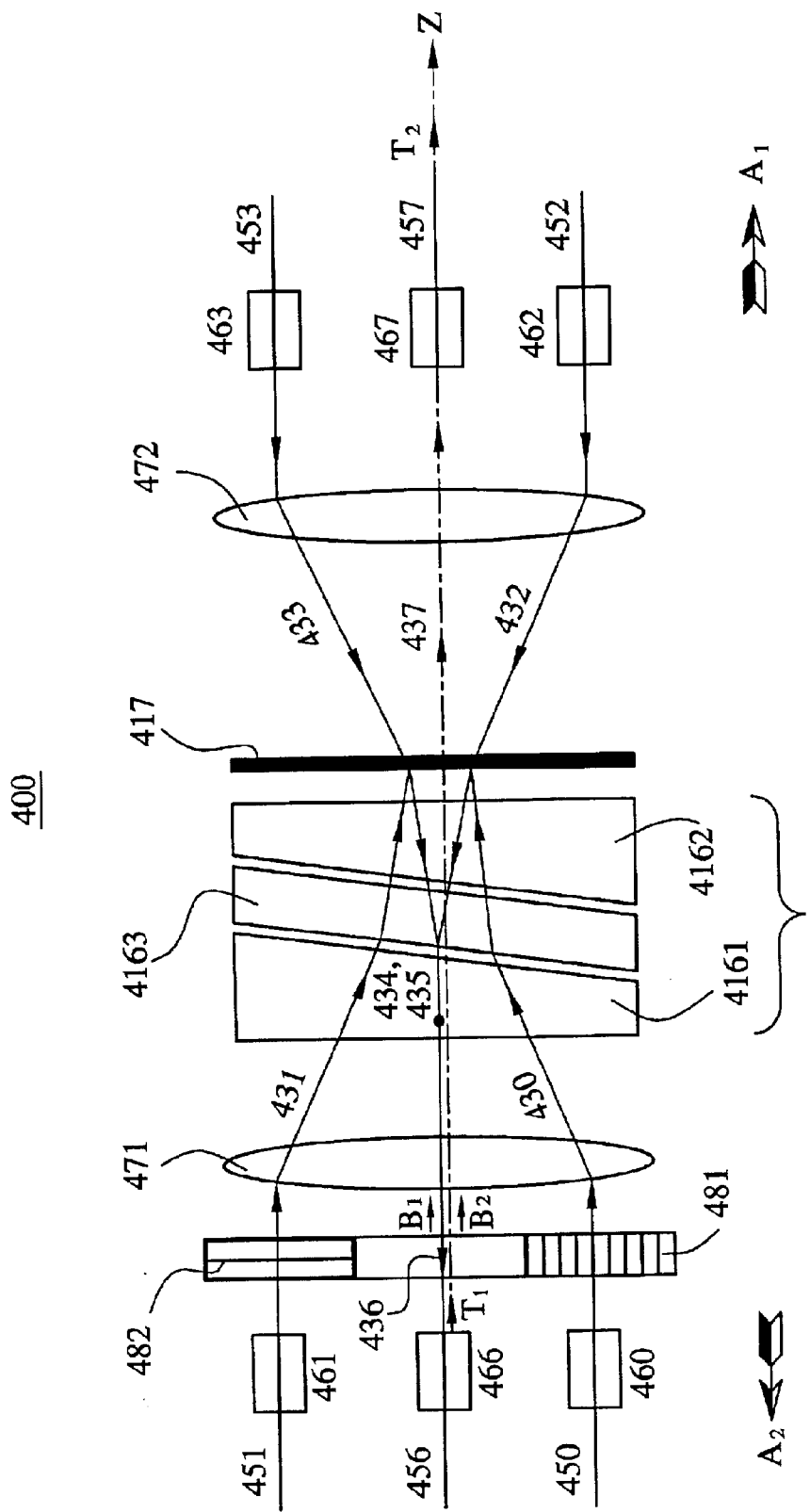
FIG. 10 shows another embodiment of the present invention as a micro-optic polarization beam multiplexing system.

FIG. 10 shows another embodiment of the present invention as a micro-optic polarization beam multiplexing system. In FIG. 10, the micro-optic system 400 has a first subassembly 460 holding an end of a first fiber 450, a second subassembly 461 holding an end of a second fiber 451. The first fiber 450 and the second fiber 451 are polarization-maintaining fibers being positioned before the first collimator 471 and parallel to the optical axis Z. The tips of the first fiber 450 and the second fiber 451 are one focus (of the first collimator 471) away from the first collimator 471. The polarization directions of the first fiber 450 and the second fiber 451 are 90 degree apart from each other for introducing the first pair of input beams 430 and 431.

The micro-optic system 400 also has a third subassembly 462 holding an end of a third fiber 452 and a fourth subassembly 463 holding an end of a fourth fiber 453. The third fiber 452 and the fourth fiber 453 are polarization-maintaining fibers being positioned after the second collimator 472 and parallel to the optical axis Z. The tips of the third fiber 452 and the fourth fiber 453 are one focus (of the second collimator 472) away from the second collimator 472. The polarization directions of the third fiber 452 and the fourth fiber 453 are 90 degree apart from each other for introducing the second pair of input beams 432 and 433.

A fifth subassembly 466 holding an end of a fifth fiber 456 is being positioned before the first collimator 471 and along the optical axis Z. The tip of the fifth fiber 456 is also one focus (of the first collimator 471) away from the first collimator 471. The fifth fiber is a single mode optical fiber for receiving the output beam 436. Each of the first collimator 471 and the second collimator 472 can have a GRIN lens, or a spherical lens, or an aspherical lens or any other collimating devices familiar to those skilled in the art.

The polarization beam combiner 416 has a first wedge 4161, a second wedge 4162 and a +45° Faraday rotator 4163 disposed between the first wedge 4161 and the second wedge 4162. The first wedge 4161, the Faraday rotator 4163 and the second wedge 4162 are cascaded along the optical axis Z in a forward direction $A_1$. The second wedge 4162 is oriented 45° with respect to the first wedge 4161 in the same direction as the rotation caused by the Faraday rotator 4163. A filter 417 is disposed after the second wedge 4162.

The working principles of the polarization beam combiner 416 and the filter 417 of this embodiment as shown in FIG. 10 are similar to the corresponding working principles of the embodiment of FIGS. 6 to 8. The filter 417 reflects the first pair of input beams 430, 431 with wavelength $\lambda_{1o}$ and wavelength $\lambda_{1e}$ and is transparent to the second pair of input beams 432, 433 with wavelength $\lambda_{2o}$ and wavelength $\lambda_{2e}$. Thus, the polarization beam combiner 416 combines the first pair of input beams 430, 431 into a first combined light beam 434 with wavelength $\lambda_1$ in the backward direction $A_2$ along the optical axis Z and the second pair of input beams 432, 433 into a second combined light beam 435 with wavelength $\lambda_2$ in the backward direction $A_2$ along the optical axis Z. At the same time, the filter 417 multiplexes the first combined light beam 434 and the second combined light beam 435 into an output beam 436.

Still referring to FIG. 10, the micro-optic system 400 further has a first polarizer 481 and a second polarizer 482. The first polarizer 481 is disposed in front of the first fiber 450 and the polarization direction of the first polarizer 481 is same as that of the first fiber 450. The a second polarizer 482 is disposed in front of the second fiber 451 and the polarization direction of the second polarizer 482 is same as that of the second fiber 451. The backing light beams $B_1$ of the first pair of input beams 430, 431 from the fifth fiber 456 are reflected by the filter 417 and blocked by the first polarizer 481 and the second polarizer 482 respectively from entering into the first fiber 450 and the second fiber 451. The backing light beams $B_2$ of the second pair of input beams 432, 433 from the fifth fiber 456 pass through the polarization beam combiner 416 and the filter 417 and become parallel to the optical axis Z, thereby being prevented from entering into the third fiber 452 and the fourth fiber 453. Each of the first polarizer 481 and the second polarizer 482 can have any form of polarizers familiar to those skilled in the art, e.g. a sheet polarizer.

The micro-optic system 400 of the present invention further has a six subassembly 467 holding an end of a sixth fiber 457. The sixth fiber 457 is a single mode optical fiber disposed after the second collimator 472 along the optical axis Z and the tip of the sixth fiber 457 is one focus (of the second collimator 472) away from the second collimator 472. The light beam ($T_1$) with telecommunication signals propagating in forward direction $A_1$ from the fifth fiber 456 passes through the first collimator 471, the polarization beam combiner 416, the filter 417 and the second collimator 472 and then becomes $T_2$ entering into the sixth fiber 457.

Figure 11:
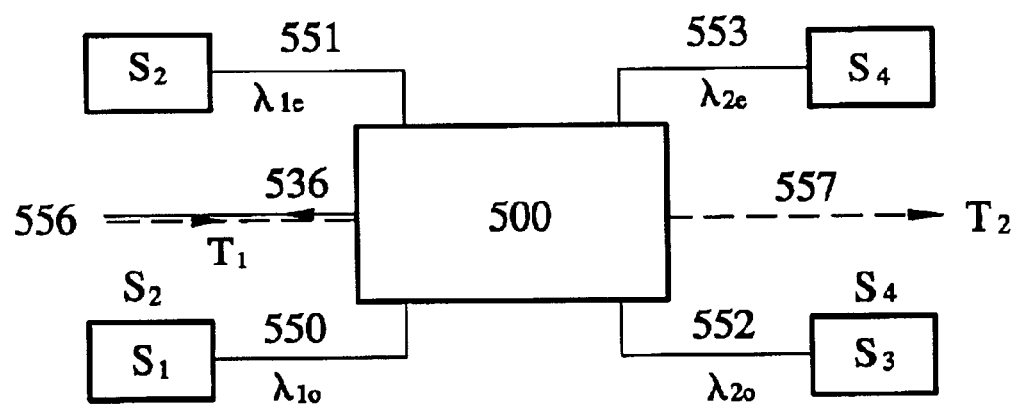
FIG. 11 is a schematic view of an application of the micro-optic system of FIG. 10.

The micro-optic polarization beam multiplexing system of the embodiment can be used for Raman pumping. FIG. 11 is a schematic view of an application of the micro-optic system of FIG. 10. In FIG. 11, System 500 is the micro-optic polarization beam multiplexing system of FIG. 10. The polarization-maintaining fibers 550 and 551 introduce a first pair of input radiations from the first pair of sources $S_1$ and $S_2$. The polarization-maintaining fibers 552 and 553 introduce a second pair of input radiations from the second pair of sources $S_3$ and $S_4$. The output radiation 536 of the system 500 is the combination of the first pair of input radiations and the second pair of input radiations for Raman pumping. The telecommunication signals ($T_1$, signal in) propagating in forward direction $A_1$ from the single mode optical fiber 556 passes through the system 500 and then enters into the single mode optical fiber 557 ($T_2$, signal out). In one example of the application, the wavelengths $\lambda_{1o}$, $\lambda_{1e}$ of the first pair of input radiations 550, 551 are substantially 1435 nm and the wavelengths $\lambda_{2o}$ and $\lambda_{2e}$ of the second pair of input radiations 552, 553 are substantially 1455 nm.

Due to the unique design of the micro-optical polarization beam multiplexing system of the embodiment of FIG. 10, only one polarization beam combiner and one filter are used. Also, no isolator is needed due to the introduction of the first polarizer 481, second polarizer 482 and the unique structure of the system 400 as shown in FIG. 10. It is apparent to those skilled in the art that the micro-optic polarization system 400 of the embodiment as shown in FIG. 10 can also be used for pumping an EFDA.

Figure 12:
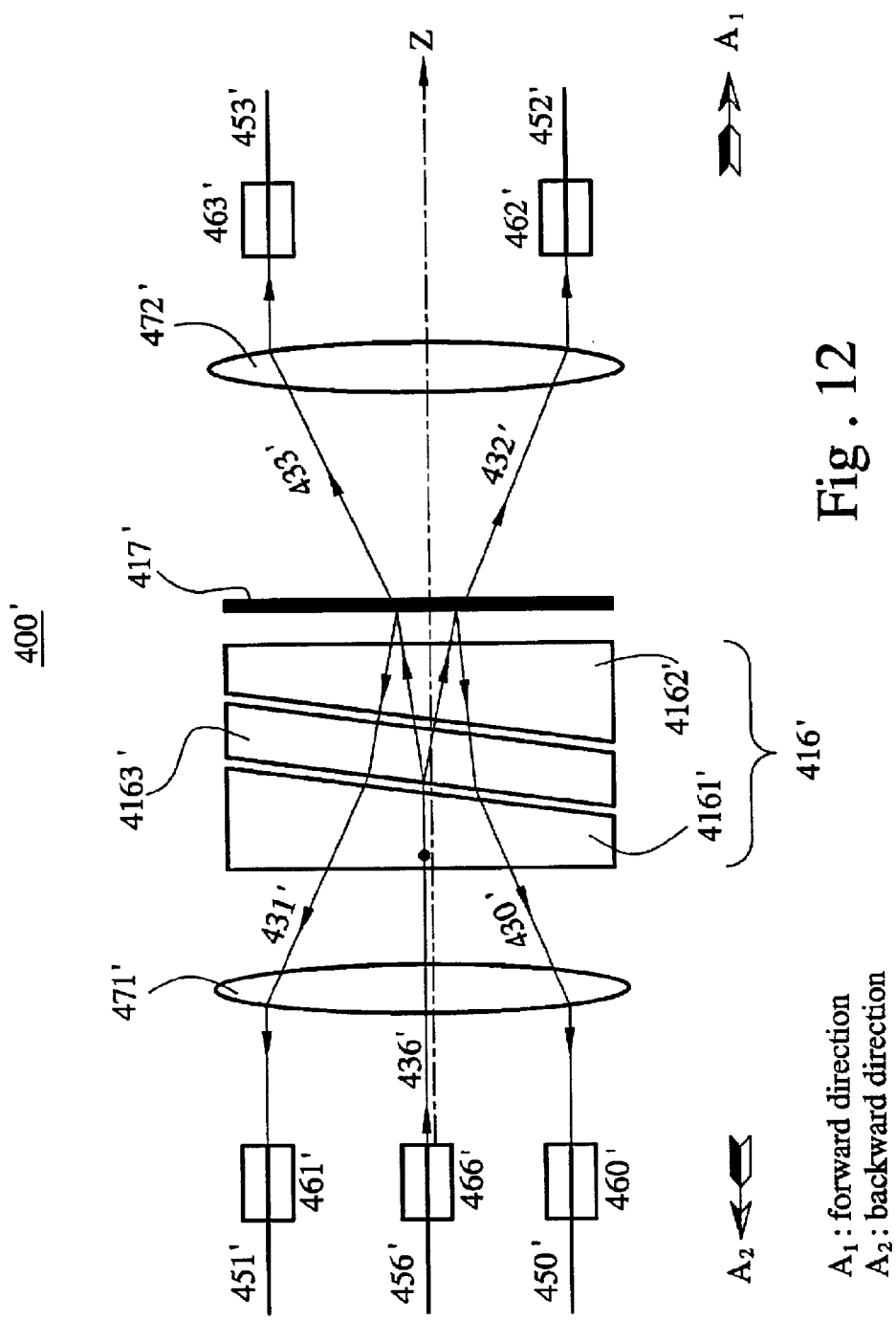
FIG. 12 shows yet another embodiment of the present invention as a micro-optic de-multiplexing system.

FIG. 12 shows yet another embodiment of the present invention as a micro-optic de-multiplexing system. In FIG. 12, the micro-optic polarization beam de-multiplexing system 400' has a first subassembly 460' holding an end of a first fiber 450', a second subassembly 461' holding an end of a second fiber 451'. The first fiber 450' and the second fiber 451' are polarization-maintaining fibers or single mode optical fibers being positioned before the first collimator 471' and parallel to the optical axis Z. The tips of the first fiber 450' and the second fiber 451' are one focus (of the first collimator 471') away from the first collimator 471'.

The micro-optic system 400' also has a third subassembly 462' holding an end of a third fiber 452' and a fourth subassembly 463' holding an end of a fourth fiber 453'. The third fiber 452' and the fourth fiber 453' are polarization-maintaining fibers or single mode optical fibers being positioned after the second collimator 472' and parallel to the optical axis Z. The tips of the third fiber 452' and the fourth fiber 453' are one focus (of the second collimator 472') away from the second collimator 472'.

A fifth subassembly 466' holding an end of a fifth fiber 456' is positioned before the first collimator 471' and along the optical axis Z. The tip of the fifth fiber 456' is also one focus (of the first collimator 471') away from the first collimator 471'. The fifth fiber 456' is a single mode optical fiber for introducing the input beam 436'.

The polarization beam splitter 416' has a first wedge 4161', a second wedge 4162' and a +45° Faraday rotator 4162' disposed between the first wedge 4161' and the second wedge 4162'. The first wedge 4161', the Faraday rotator 4163' and the second wedge 4162' are cascaded along an optical axis Z in a forward direction $A_1$. The second wedge 4162' is oriented 45° with respect to the first wedge 4161' in the opposite direction as the rotation caused by the Faraday rotator 4163'. A filter 417' is disposed after the second wedge 4162'.

The working principles of the polarization beam splitter 416' and the filter 417' of this embodiment as shown in FIG. 12 are similar to the corresponding working principles of the embodiment of FIG. 9. The filter 417' reflects the portion of light beams with wavelength $\lambda_1$ of the input beam 436' and is transparent to the portion of light beams with wavelength $\lambda_2$ of the input beam 436', thereby the filter 317' de-multiplexing the input beam 436' into a first de-multiplexed light beam 434' with wavelength $\lambda_1$ and a second de-multiplexed light beam 435' with wavelength $\lambda_2$. The polarization beam splitter 416' splits the first de-multiplexed light beam 434' into a first pair of output beams comprising a first output ordinary beam 430' with wavelength $\lambda_{1o}$ and a first output extraordinary beam 431' with wavelength $\lambda_{1e}$, and the second de-multiplexed light beam 435' into a second pair of output beams comprising a second output ordinary beam 432' with wavelength $\lambda_{2o}$ and a second output extraordinary beams 433' with wavelength $\lambda_{2e}$.

Each subassembly for holding a fiber in the present invention can be any form of single or array-type subassembly familiar to those skilled in the art. Also, each subassembly is not necessarily a separate one. Two or more subassemblies can share one fiber-holding and adjusting device familiar to those skilled in the art.

The embodiments of the present invention should not be considered to handle only two pairs of polarization-perpendicular beams. By methods of duplicating, cascading or combining familiar to those skilled in the art, the embodiments of the present invention can be used to handle more than two pairs of polarization-perpendicular beams. Different embodiments of the present invention can also work together to handle more pairs of polarization-perpendicular beams with different wavelengths.

The present invention should not be considered limited to the particular examples described above, but rather should be understood to cover all aspects of the present invention as fairly set out in the attached claims. Various modifications, equivalents, as well as numerous geometrical configurations to which the present invention may be applicable will be readily apparent to those of skill in the art to which the present invention is directed upon review of the present specification.

What is claimed is:

1. A micro-optic system comprising:
    a first collimating means for introducing a first input ordinary beam with wavelength $\lambda_{1o}$ of a first pair of input beams,
    a second collimating means for introducing a first input extraordinary beam with wavelength $\lambda_{1e}$ of said first pair of input beams,
    a third collimating means for introducing a second input ordinary beam with wavelength $\lambda_{2o}$ of a second pair of input beams,
    a fourth collimating means for introducing a second input extraordinary beam with wavelength $\lambda_{2e}$ of said second pair of input beams,
    a polarization beam combiner for combining said first pair of input beams and said second pair of input beams into a first combined light beam with wavelength $\lambda_1$ and a second combined light beam with wavelength $\lambda_2$, and
    a filter for multiplexing said first combined light beam and said second combined light beam into an output beam,
    wherein said wavelength $\lambda_1$ equals to said wavelength $\lambda_{1o}$ and said wavelength $\lambda_{1e}$, said wavelength $\lambda_2$ equals to said wavelength $\lambda_{2o}$ and said wavelength $\lambda_{2e}$.

2. The micro-optic system of claim 1, further comprising a fifth collimating means for receiving said output beam.

3. The micro-optic system of claim 2, wherein said first collimating means, said second collimating means and said fifth collimating means are the same one.

4. The micro-optic system of claim 1, wherein said third collimating means and said fourth collimating means are the same one.

5. The micro-optic system of claim 2, further comprising:
    a first subassembly holding an end of a first fiber in paraxial relationship with said first collimating means,
    a second subassembly holding an end of a second fiber in paraxial relationship with said second collimating means,
    a third subassembly holding an end of a third fiber in paraxial relationship with said third collimating means,
    a fourth subassembly holding an end of a fourth fiber in paraxial relationship with said fourth collimating means, and
    a fifth subassembly holding an end of a fifth fiber in paraxial relationship with said fifth collimating means,
    wherein said first fiber, said second fiber, said third fiber and said fourth fiber are polarization-maintaining optical fibers, said fifth fiber is a single mode optical fiber.

6. The micro-optic system of claim 2, wherein said first collimating means, said second collimating means, said third collimating means, said fourth collimating means and said fifth collimating means each comprises a lens selected from a group consisting of GRIN lens, spherical lean and aspherical lens.

7. The micro-optic system of claim 1, wherein said polarization beam combiner comprises at least one birefringent crystal.

8. The micro-optic system of claim 7, wherein said birefringent crystal comprises a material selected from group consisting of Calcite, $YVO_4$, Rutile and $LiNbO_3$.

9. The micro-optic system of claim 1, wherein said polarization beam combiner comprises a prism selected from the group consisting of Glan polarizing prism, right angle prism coated with thin film, Nicol prism, Wollaston prism, Rochon prism and Sénarmont prism.

10. The micro-optic system of claim 1, wherein said polarization beam combiner comprising:
    a first wedge,
    a second wedge, and
    a Faraday rotator disposed between said first wedge and said second wedge,
    wherein said first wedge, said faraday rotator and said second wedge are cascaded along an optical axis.

11. The micro-optic system of claim 1, wherein said filter is disposed before said polarization beam combiner.

12. The micro-optic system of claim 1, wherein said filter is disposed after said polarization beam combiner.

13. The micro-optic system of claim 1, wherein said filter is disposed inside said polarization beam combiner.

14. The micro-optic system of claim 1, wherein said filter comprises a device selected from a group consisting of grating and thin film.

15. A micro-optic system comprising:
an input beam collimating means for introducing an input beam with wavelength $\lambda_1$ and wavelength $\lambda_2$,
a filter for de-multiplexing said input beam into a first de-multiplexed light beam with wavelength $\lambda_1$ and a second de-multiplexed light beam with wavelength $\lambda_2$, and
a polarization beam splitter for splitting said first de-multiplexed light beam and said second de-multiplexed light beam into a first pair of output beams comprising a first output ordinary beam with wavelength $\lambda_{1o}$ and a first output extraordinary beam with wavelength $\lambda_{1e}$ and a second pair of output beams comprising a second output ordinary beam with wavelength $\lambda_{2o}$ and a second output extraordinary beams with wavelength $\lambda_{2e}$,
wherein said wavelength $\lambda_1$ equals to said wavelength $\lambda_{1o}$ and said wavelength $\lambda_{1e}$, said wavelength $\lambda_2$ equals to said wavelength $\lambda_{2o}$ and said wavelength $\lambda_{2e}$.

16. The micro-optic system of claim 15, further comprising:
a first collimating means for receiving said first output ordinary beam,
a second collimating means for receiving said first output extraordinary beam,
a third collimating means for receiving said second output ordinary beam,
a fourth collimating means for receiving said second output extraordinary beam.

17. The micro-optic system of claim 16, wherein said first collimating means and said second collimating means are the same one.

18. The micro-optic system of claim 16, wherein said third collimating means and said fourth collimating means are the same one.

19. The micro-optic system of claim 16, further comprising:
a first subassembly holding an end of a first fiber in paraxial relationship with said first collimating means,
a second subassembly holding an end of a second fiber in paraxial relationship with said second collimating means,
a third subassembly holding an end of a third fiber in paraxial relationship with said third collimating,
a fourth subassembly holding an end of a fourth fiber in paraxial relationship with said fourth collimating means, and
a fifth subassembly holding an end of a fifth fiber in paraxial relationship with said input beam collimating means,
wherein said fifth fiber is a single mode optical fiber.

20. The micro-optic system of claim 19, wherein each of said first fiber, said second fiber, said third fiber, and said fourth fiber comprises an optical fiber selected from a group consisting of polarization maintaining optical fiber and single mode optical fiber.

21. The micro-optic system of claim 16, wherein said first collimating means, said second collimating means, said third collimating means, said fourth collimating means and said input beam collimating means each comprises a lens selected from a group consisting of GRIN lens, spherical lens and aspherical lens.

22. The micro-optic system of claim 15, wherein said polarization beam splitter comprises a prism selected from the group consisting of Glan polarizing prism, right angle prism coated with thin film, Nicol prism, Wollaston prism, Rochon prism and Sénarmont prism.

23. The micro-optic system of claim 15, wherein said polarization beam splitter comprising:
a first wedge,
a second wedge, and
a Faraday rotator disposed between said first wedge and said second wedge,
wherein said first wedge, said faraday rotator and said second wedge are cascaded along an optical axis.

24. The micro-optic system of claim 15, wherein said filter is disposed before said polarization beam splitter.

25. The micro-optic system of claim 15, wherein said filter is disposed after said polarization beam splitter.

26. The micro-optic system of claim 15, wherein said filter is disposed inside said polarization beam splitter.

27. A micro-optic system comprising:
a first collimating means for introducing a first input ordinary beam with wavelength $\lambda_{1o}$ of a first pair of input beams,
a second collimating means for introducing a first input extraordinary beam with wavelength $\lambda_{1e}$ of said first pair of input beams,
a third collimating means for introducing a second input ordinary beam with wavelength $\lambda_{2o}$ of a second pair of input beams,
a fourth collimating means for introducing a second input extraordinary beam with wavelength $\lambda_{2e}$ of said second pair of input beams,
a polarizing prism having a first half with a first external surface and a second external surface, and a second half with a third external surface opposing to said second external surface and a fourth external surface opposing to said first external surface, the centers of said second external surface and said third external surface defining an optical axis, said first half combining said first pair of input beams which are incident on said first external surface into a first combined light beam with wavelength $\lambda_1$, said second half and said first half combining said second pair of input beams which are incident on said third external surface into a second combined light beam with wavelength $\lambda_2$, and
a filter disposed between said first half and said second half, said filter reflecting light beam with wavelength $\lambda_1$ and being transparent to light beam with wavelength $\lambda_2$, thereby said filter multiplexing said first combined light beam and said second combined light beam into an output beam along said optical axis,
wherein said wavelength $\lambda_1$ equals to said wavelength $\lambda_{1o}$ and said wavelength $\lambda_{1e}$, said wavelength $\lambda_2$ equals to said wavelength $\lambda_{2o}$ and said wavelength $\lambda_{2e}$.

28. The micro-optic system of claim 27, further comprising a fifth collimating means for receiving said output beam.

29. The micro-optic system of claim 28, further comprising:
a first subassembly holding an end of a first fiber in paraxial relationship with said first collimating means,
a second subassembly holding an end of a second fiber in paraxial relationship with said second collimating means,
a third subassembly holding an end of a third fiber in paraxial relationship with said third collimating means,
a fourth subassembly holding an end of a fourth fiber in paraxial relationship with said fourth collimating means, and a fifth subassembly holding an end of a fifth fiber in paraxial relationship with said fifth collimating means, wherein said first fiber, said second fiber, said third fiber and said fourth fiber are polarization-maintaining optical fibers, said fifth fiber is a single mode optical fiber.

30. The micro-optic system of claim 28, wherein said first collimating means, said second collimating means, said third collimating means, said fourth collimating means and said fifth collimating means each comprises a lens selected from a group consisting of GRIN lens, spherical lens and aspherical lens.

31. The micro-optic system of claim 27, wherein said polarizing prism comprises a prism selected from the group consisting of Wollaston prism, Rochon prism and Sénarmont prism.

32. The micro-optic system of claim 27, wherein said filter comprises a device selected from a group consisting of grating and thin film.

33. A micro-optic system comprising:
an input beam collimating means for introducing an input beam with wavelength $\lambda_1$ and wavelength $\lambda_2$,
a polarizing prism having a first half with a first external surface and a second external surface, and a second half with a third external surface opposing to said second external surface and a fourth external surface opposing to said first external surface, the centers of said second external surface and said third external surface defining an optical axis, and
a filter disposed between said first half and said second half, said filter reflecting the portion of light beam with wavelength $\lambda_1$ of said input beam and being transparent to the portion of light beam with wavelength $\lambda_2$ of said input beam, thereby said filter de-multiplexing said input light beam which is incident along said optical axis on said second external surface into a first de-multiplexed light beam with wavelength $\lambda_1$ and a second de-multiplexed light beam wavelength $\lambda_2$, said first half splitting said first de-multiplexed light beam into a first pair of output beams comprising a first output ordinary beam with wavelength $\lambda_{1o}$ and a first output extraordinary beam with wavelength $\lambda_{1e}$, said second half splitting said second de-multiplexed light beam into a second pair of output beams comprising a second output ordinary beam with wavelength $\lambda_{2o}$ and a second output extraordinary beams with wavelength $\lambda_{2e}$,
wherein said wavelength $\lambda_1$ equals to said wavelength $\lambda_{1o}$ and said wavelength $\lambda_{1e}$, said wavelength $\lambda_2$ equals to said wavelength $\lambda_{2o}$ and said wavelength $\lambda_{2e}$.

34. The micro-optic system of claim 33, further comprising:
a first collimating means for receiving said first output ordinary beam,
a second collimating means for receiving said first output extraordinary beam,
a third collimating means for receiving said second output ordinary beam,
a fourth collimating means for receiving said second output extraordinary beam.

35. The micro-optic system of claim 34, further comprising:
a first subassembly holding an end of a first fiber in paraxial relationship with said first collimating means,
a second subassembly holding an end of a second fiber in paraxial relationship with said second collimating means,
a third subassembly holding an end of a third fiber in paraxial relationship with said third collimating means,
a fourth subassembly holding an end of a fourth fiber in paraxial relationship with said fourth collimating means, and
a fifth subassembly holding an end of a fifth fiber in paraxial relationship with said input beam collimating means,
wherein said fifth fiber is a single mode optical fiber.

36. The micro-optic system of claim 35, wherein each of said first fiber, said second fiber, said third fiber, and said fourth fiber comprises an optical fiber selected from a group consisting of polarization maintaining optical fiber and single mode optical fiber.

37. A micro-optic system comprising:
a first collimating means for introducing a first input ordinary beam with wavelength $\lambda_{1o}$ of a first pair of input beams,
a second collimating means for introducing a first input extraordinary beam with wavelength $\lambda_{1e}$ of said first pair of input beams,
a third collimating means for introducing a second input ordinary beam with wavelength $\lambda_{2o}$ of a second pair of input beams,
a fourth collimating means for introducing a second input extraordinary beam with wavelength $\lambda_{2e}$ of said second pair of input beams,
a polarization beam combiner comprising:
a first wedge,
a second wedge, and
a +45° Faraday rotator disposed between said first wedge and said second wedge,
wherein said first wedge, said faraday rotator and said second wedge are cascaded along a optical axis in a forward direction, said second wedge is oriented 45° with respect to said first wedge in the same direction as the rotation caused by said Faraday rotator, and
a filter disposed after said second wedge, said first pair of input beams being incident in said forward direction on said first wedge symmetrically with respect to said optical axis with a predetermined convergent angle between each other, propagating through said first wedge, said Faraday rotator and said second wedge, and then being incident on said filter, said second pair of input beams being incident in a backward direction opposite to said forward direction on said filter symmetrically with respect to said optical axis with a predetermined convergent angle between each other, said filter reflecting said first pair of input beams and being transparent to said second pair of input beams, thereby said polarization beam combiner combining said first pair of input beams into a first combined light beam with wavelength $\lambda_1$ in said backward direction along said optical axis and said second pair of input beams into a second combined light beam with wavelength $\lambda_2$ in said backward direction along said optical axis, and said filter multiplexing said first combined light beam and said second combined light beam into an output beam,
wherein said wavelength $\lambda_1$ equals to said wavelength $\lambda_{1o}$ and said wavelength $\lambda_{1e}$, said wavelength $\lambda_2$ equals to said wavelength $\lambda_{2o}$ and said wavelength $\lambda_{2e}$.

38. The micro-optic system of claim 37, further comprising a fifth collimating means for receiving said output beam.

39. The micro-optic system of claim 38, wherein said first collimating means, said second collimating means and said fifth collimating means share a first collimator, said third collimating means and said fourth collimating means share a second collimator, said first collimator is positioned before said first wedge, said second collimator is positioned after said filter.

40. The optical system of claim 39, further comprising:
a first subassembly holding an end of a first fiber,
a second subassembly holding an end of a second fiber, said first fiber and said second fiber being polarization-maintaining fibers being positioned before said first collimator and parallel to said optical axis, the tips of said first fiber and said second fiber being one focus away from said first collimator, the polarization directions of said first fiber and said second fiber being 90 degree apart from each other for introducing said first pair of input beams,
a third subassembly holding an end of a third fiber,
a fourth subassembly holding an end of a fourth fiber, said third fiber and said fourth fiber being polarization-maintaining fibers being positioned after said second collimator and parallel to said optical axis, the tips of said third fiber and said fourth fiber being one focus away from said second collimator, the polarization directions of said third fiber and said fourth fiber being 90 degree apart from each other for introducing said second pair of input beams, and
a fifth subassembly holding an end of a fifth fiber, said fifth fiber being positioned before said first collimator and along said optical axis, the tip of said fifth fiber being one focus away from said first collimator, said fifth fiber being a single mode optical fiber for receiving said output beam.

41. The optical system of claim 40, further comprising:
a first polarizer disposed in front of said first fiber, the polarization direction of said first polarizer being same as that of said first fiber, and
a second polarizer disposed in front of said second fiber, the polarization direction of said second polarizer being same as that of said second fiber,
wherein the backing light beams of said first combined light beam from said fifth fiber are reflected by said filter and blocked by said first polarizer and said second polarizer respectively from entering into said first fiber and said second fiber, and the backing light beams of said second combined light beam from said fifth fiber pass through said polarization beam combiner and said filter and become parallel to said optical axis, thereby being prevented from entering into said third fiber and said fourth fiber.

42. The micro-optic system of claim 41, further comprising:
a six subassembly holding an end of a sixth fiber, said sixth fiber being a single mode optical fiber disposed after said second collimator along said optical axis, the tip of said sixth fiber being one focus away from said second collimator,
wherein the light beam with telecommunication signals propagating in said forward direction from said fifth fiber passes through said first collimator, said polarization beam combiner, said filter and said second collimator and then enters into said sixth fiber.

43. The micro-optic system of claim 41, wherein said output beam is a combination of said first pair of input beams and said pair of input beams for pumping a Raman amplifier.

44. The micro-optic system of claim 43, wherein said wavelength $\lambda_1$, said wavelength $\lambda_{1o}$, and said wavelength $\lambda_{1e}$ are substantially 1435 nm, said wavelength $\lambda_2$, said wavelength $\lambda_{2o}$, and said wavelength $\lambda_{2e}$ are substantially 1455 nm.

45. The micro-optic system of claim 43, wherein said output light beam a combination of said first pair of input beams and said second pair of input beams for pumping an EDFA.

46. The micro-optic system of claim 37, wherein said filter comprises a device selected from a group consisting of grating and thin film.

47. A micro-optic system comprising:
an input beam collimating means for introducing an input beam with wavelength $\lambda_1$ and wavelength $\lambda_2$,
a polarization beam splitter comprising:
a first wedge,
a second wedge, and
a +45° Faraday rotator disposed between said first wedge and said second wedge,
wherein said first wedge, said faraday rotator and said second wedge are cascaded along an optical axis in a forward direction, said second wedge is oriented 45° with respect to said first wedge in the opposite direction as the rotation caused by said Faraday rotator, and
a filter disposed after said second wedge, said input beam being incident along said optical axis, passing through said polarization beam splitter and then incident on said filter, said filter reflecting the portion of light beams with wavelength $\lambda_1$ of said input beam and being transparent to the portion of light beams with wavelength $\lambda_2$ of said input beam, thereby said filter de-multiplexing said input beam into a first de-multiplexed light beam with wavelength $\lambda_1$ and a second de-multiplexed light beam with wavelength $\lambda_2$, said polarization beam splitter splitting said first de-multiplexed light beam into a first pair of output beams comprising a first output ordinary beam with wavelength $\lambda_{1o}$ and a first output extraordinary beam with wavelength $\lambda_{1e}$ in a backward direction opposite to said forward direction symmetrically with respect to said optical axis with a predetermined diverging angle between each other, and said second de-multiplexed light beam into a second pair of output beams comprising a second output ordinary beam with wavelength $\lambda_{2o}$ and a second output extraordinary beams with wavelength $\lambda_{2e}$ in said forward direction symmetrically with respect to said optical axis with a predetermined diverging angle between each other,
wherein said wavelength $\lambda_1$ equals to said wavelength $\lambda_{1o}$ and said wavelength $\lambda_{1e}$, said wavelength $\lambda_2$ equals to said wavelength $\lambda_{2o}$ and said wavelength $\lambda_{2e}$.

48. The optical system of claim 47, further comprising:
a first collimating means for receiving said first output ordinary beam,
a second collimating means for receiving said first output extraordinary beam,
a third collimating means for receiving said second output ordinary beam,
a fourth collimating means for receiving said second output extraordinary beam.

49. The optical system of claim 48, wherein said first collimating means, said second collimating means and input beam collimating means share a first collimator, said third collimating means and said fourth collimating means share a second collimator, said first collimator is positioned before said first wedge, said second collimator is positioned after said filter.

50. The optical system of claim 49, further comprising:

a first subassembly holding an end of a first fiber, a second subassembly holding an end of a second fiber, said first fiber and said second fiber being positioned before said first collimator and parallel to said optical axis, the tips of said first fiber and said second fiber being one focus away from said first collimator, the polarization directions of said first fiber and said second fiber being 90 degree apart from each other for receiving said first pair of input beams, a third subassembly holding an end of a third fiber, a fourth subassembly holding an end of a fourth fiber, said third fiber and said fourth fiber being positioned after said second collimator and parallel to said optical axis, the tips of said third fiber and said fourth fiber being one focus away from said second collimator, the polarization directions of said third fiber and said fourth fiber being 90 degree apart from each other for receiving said second pair of input beams, and a fifth subassembly holding an end of a fifth fiber, said fifth fiber being positioned before said first collimator and along said optical axis, the tip of said fifth fiber being one focus away from said first collimator for introducing said input beam, wherein said fifth fiber is a single mode optical fiber.

51. The micro-optic system of claim 50, wherein each of said first fiber, said second fiber, said third fiber, and said fourth fiber comprises an optical fiber selected from a group consisting of polarization maintaining optical fiber and single mode optical fiber.

\* \* \* \* \*